United States Patent [19]
Hagiwara

[11] Patent Number: 5,842,058
[45] Date of Patent: Nov. 24, 1998

[54] ACCUMULATION TIME CONTROL DEVICE FOR PHOTOELECTRIC CONVERSION ELEMENT, AND FOCUS DETECTION APPARATUS USING THE SAME

[75] Inventor: Shinichi Hagiwara, Yokohama, Japan

[73] Assignee: Canon Kabushiki Kaisha, Tokyo, Japan

[21] Appl. No.: 936,581

[22] Filed: Sep. 24, 1997

[30] Foreign Application Priority Data

Sep. 27, 1996 [JP] Japan .................................. 8-256168

[51] Int. Cl.$^6$ .............................. G03B 13/36; H04N 3/14
[52] U.S. Cl. ........................................... 396/96; 348/298
[58] Field of Search ............................. 396/96; 348/297, 348/298, 299

[56] References Cited

U.S. PATENT DOCUMENTS

| | | | |
|---|---|---|---|
| 4,952,963 | 8/1990 | Akashi | 396/96 |
| 5,182,658 | 1/1993 | Ishizaki et al. | 348/298 |
| 5,262,850 | 11/1993 | Hashimoto | 348/298 |
| 5,526,088 | 6/1996 | Kusaka | 396/96 |
| 5,528,330 | 6/1996 | Utagawa | 396/96 |

Primary Examiner—W. B. Perkey
Attorney, Agent, or Firm—Morgan & Finnegan, LLP

[57] ABSTRACT

In order to realize focus detection using distance measurement areas more than the prior art without increasing the circuit scale, an accumulation control device has an AF sensor driving device SDR, which has i accumulation controllers that are fewer than the number j of photoelectric conversion element arrays and independently perform accumulation control of photoelectric conversion element arrays SNS-1A and SNS-1B to SNS-jA and SNS-jB in units of arrays in accordance with accumulation monitor signals, and a multiplexer DETMPX for selectively switching the accumulation monitor signals to be supplied from the photoelectric conversion element arrays to the accumulation controllers via signal lines BMON1 to BMONi. Photoelectric conversion element arrays equal to the number i of accumulation controllers are selected from the j photoelectric conversion element arrays, and accumulation control is done using only the accumulation control signals output from the selected photoelectric conversion element arrays. Focus adjustment can be performed by freely selecting an arbitrary distance measurement point from a broad distance measurement area without increasing the circuit scale of the accumulation controllers.

7 Claims, 18 Drawing Sheets

PRIOR ART

ACCUMULATION TIME CONTROL DEVICE FOR PHOTOELECTRIC CONVERSION ELEMENT, AND FOCUS DETECTION APPARATUS USING THE SAME

BACKGROUND OF THE INVENTION

1. Field of the Invention

The present invention relates to an accumulation control device for a photoelectric conversion element and, more particularly to an accumulation control device suitably used in accumulation control of an image sensor which is built in an automatic focus detection apparatus of a still or video camera to detect the focus adjustment state, and consists of a plurality of photoelectric conversion elements.

2. Related Background Art

Conventionally, a focus detection apparatus for a single-lens reflex camera comprises one focus detection area at the central portion in the photographing frame or at most about six focus detection areas which are horizontally symmetrically set in the photographing frame. Such apparatus has line sensors each constituted by a plurality of photoelectric conversion elements in correspondence with the focus detection areas, and attains focus detection by arithmetically processing image signals, as luminance distribution information of an object, which are time-serially output from the line sensors.

The conventional focus detection apparatus will be briefly described below using a focus detection optical system shown in FIG. 16. FIG. 16 shows an optical system comprising five phase-difference type focus detection areas.

In this conventional focus detection apparatus, a field lens AFFL, a porous field mask AFMSK, a secondary imaging lens AFDL, a stop plate AFDP, and a sensor device SNS with a plurality of pairs of line sensors as photoelectric conversion element arrays are arranged, as shown in FIG. 16.

The porous field mask AFMSK is arranged in the vicinity of the prospective imaging plane of a photographing objective lens (not shown), and slits AFMSK-1 to AFMSK-5 respectively determine distance measurement fields.

The stop plate AFDP limits light beams that enter the secondary imaging lens AFDL via the above-mentioned slits AFMSK-1 to AFMSK-5 and the field lens AFFL. The stop plate AFDP is placed at the position of the exit pupil of the photographing objective lens to have a substantially imaging relationship due to the power of the field lens AFFL.

The secondary imaging lens AFDL is made up of four pairs of positive lenses. For example, a pair of positive lenses AFDP-1A and AFDP-1B re-form a portion of an object image demarcated by the slit AFMSK-1 nearly on a pair of line sensors SNS-2A and SNS-2B. On the other hand, the pair of positive lenses AFDP-1A and AFDP-1B re-form a portion demarcated by the slit AFMSK-2 nearly on a pair of line sensors SNS-1A and SNS-1B.

A portion demarcated by the slit AFMSK-3 is divided into two orthogonal light beam components, which are respectively projected onto a pair of line sensors SNS-3A and SNS-3B, and a pair of line sensors SNS-4A and SNS-4B, by a pair of positive lenses AFDP-3A and AFDP-3B, and a pair of positive lenses AFDP-4A and AFDP-4B.

The outputs from the individual line sensors are read out as electrical signals corresponding to the luminance values of light beams irradiated on these sensors, and values representing the focal point states of the objective lens with respect to object portions within the distance measurement fields demarcated by the slits are calculated.

FIG. 17 shows the state observed when the photographer looks into the finder of the camera, and depicts the positional relationship among the individual focus detection areas. In FIG. 17, a field mask FIMSK forms a finder field area, and within an observation area (photographing area) FIARA, the photographer can observe an object via a photographing lens attached to the camera main body. Also, a finder LCD (liquid crystal display unit) FDSP displays photographing information inside the finder.

On the photographing area FIARA shown in FIG. 17, the distance measurement fields demarcated by the five slits can be set at, e.g., positions of AFP1 to AFP5.

The five distance measurement fields AFP1 to AFP5 within the photographing area FIARA represent five distance measurement points, and the photographer selects an arbitrary one of these five distance measurement points. The distance measurement points AFP1 to AFP5 respectively correspond to the pairs of line sensors that build the sensor device SNS of the imaging optical system shown in FIG. 16, as described above.

FIG. 18 is a block diagram for helping explain the driving control of the conventional sensor device SNS described above.

Note that each line sensor which builds the sensor device SNS comprises an accumulation type photoelectric line sensor consisting of a phototransistor array disclosed in Japanese Patent Laid-Open Application Nos. 60-12579 to 60-12765, and the like.

Unlike a known CCD sensor or MOS sensor, the accumulation type photoelectric line sensor accumulates a charge proportional to the amount of incident light in the base portion of a transistor, and outputs a signal corresponding to the accumulated charge amount of each line sensor when the accumulated charge is read out. Since the operation of a photoelectric conversion element itself that builds the accumulation type photoelectric line sensor is disclosed in the above-mentioned references, a detailed description thereof will be omitted.

In FIG. 18, the above-mentioned line sensors SNS-1A and SNS-1B to SNS-6A and SNS-6B are arranged on a single chip, and the two line sensors SNS-1A and SNS-1B constitute a pair of line sensors. The same applies to other line sensors SNS-2A and SNS-2B to SNS-6A and SNS-6B. The control and driving for accumulating and reading out charges are done in units of pairs of line sensors.

Monitor signal output units DET1 to DET6 are arranged to have a one-to-one correspondence with the pairs of line sensors, and output accumulation monitor signals of the pairs of line sensors. As the contents of each accumulation monitor signal, a signal having the maximum value among those output from a plurality of photoelectric conversion elements that build the pair of line sensors, or a signal representing the difference between the maximum and minimum values, i.e., the contrast component, may be used.

Signal I/O units BMON1 to BMON6 have a function of outputting accumulation monitor signals from the monitor signal output units DET1 to DET6, and a function of supplying an input signal from a sensor driving device to a controller SCNT, via two-way signal communications between the sensor device SNS and the sensor driving device.

Signal input units BDR1 to BDR4 input predetermined driving signals to the controller SCNT to attain switching control of, e.g., initialization, accumulation, image signal reading, and the like of the line sensors SNS-1A to SNS-6B that make up the sensor device SNS, and their driving timing control in correspondence with the combinations of these driving signals.

The controller SCNT comprises a sensor driving unit, a selection unit for selectively reading out received light outputs of the line sensors, and a driving mode setting unit, which operate in accordance with the driving signals input from the signal input units BDR1 to BDR4. That is, the driving signals input from the signal input units BDR1 to BDR4 have a plurality of functions of, e.g., giving a reference for a driving timing signal, selecting a certain pair of line sensors, and so on. Furthermore, the driving signal input from the signal input unit BDR1 has a function of selecting a certain pair of line sensors to be driven to read out a charge therefrom from the six pairs of line sensors.

A block DRVCNT in the controller SCNT has a function of generating a driving timing signal, and a function of driving the selected pair of line sensors to time-serially read out image signals as their received light outputs, and is an especially important portion. An amplifier unit SAMP amplifies image signals read out from the line sensors via the controller SCNT with a predetermined gain. In this manner, the image signals are hardly influenced by disturbances such as external noise produced when weak image signals are directly output.

Image signals from one pair of line sensors selected in advance from the six pairs of line sensors in accordance with the driving signal input from the signal input unit BDR1 are output from a signal output unit SOUT via the amplifier unit SAMP on the basis of predetermined driving signals.

The operation will be described below. After the line sensors are initialized by the driving signals input from the signal input unit BDR1 to BDR4, accumulation is started. The individual line sensors accumulate charges in accordance with the amount of incoming light. During such charge accumulation, accumulation monitor signals are always output to the signal I/O units BMON1 to BMON6 via the monitor signal output units DET1 to DET6.

The sensor driving device (not shown) connected via the signal I/O units BMON1 to BMON6 observes whether or not one of the accumulation monitor signals output from the sensors has reached a level designated in advance during charge accumulation in the line sensors. When the sensor driving device detects that one of the accumulation monitor signals has reached the designated level, it pulls down the detected terminal of the signal I/O units BMON1 to BMON6 to a predetermined level. The controller SCNT then executes accumulation end control for transferring the charge accumulated in the corresponding line sensor to a storage unit (not shown).

The received light output from the line sensor that has completed accumulation is selected by the driving signal input from the signal input unit BDR1 to the controller SCNT, and is then output from the signal output unit SOUT via the amplifier unit SAMP in response to the driving signals input from the DBR1 to DBR4.

The monitor signal output units DET1 to DET6 further have a saturation detection function, detect whether the maximum signal value among those output from the line sensors has reached a predetermined level slightly lower than the saturation level, and if so, output a signal to the terminal of a corresponding one of the signal I/O units BMON1 to BMON6, thus informing the sensor driving device (not shown) of signal saturation.

As described above, in the arrangement of the conventional sensor device SNS, since all the pieces of accumulation control information (accumulation monitor signals) output in units of line sensors are input to corresponding accumulation controllers (not shown) in the sensor driving device, the line sensors corresponding to the individual areas are individually and simultaneously controlled in accordance with the luminance levels of different object areas.

AGC (automatic gain control) control that automatically controls the charge accumulation time and selectively amplifies an image signal in accordance with the photoelectric conversion output level corresponding to the accumulated charge is known.

In executing AGC control, the above-mentioned object luminance level information obtained in accordance with the amount of incident light and comparison reference level information to be compared with the object luminance level information are used. The comparison reference level is set to attain accumulation control without saturating the image signal output, and a plurality of comparison reference levels can be set in combination with an image signal amplifier device that can select gains which are prepared in advance.

According to U.S. Pat. No. 5,182,658 that proposes an example of AGC control, using a means for detecting the output level of an image sensor during charge accumulation, and a means for discriminating the accumulation time on the basis of the detection signal, the gain is changed by the accumulation time controlled and discriminated by the detection signal.

According to the contents of this patent, since the gain is changed based on the discriminated accumulation time, for example, when this control is applied to a system that always makes the level of the amplified image signal constant, the accumulation end level is selected from the combination of the detection timing of the output level of the image sensor, the detected output level, and the gain that can be changed, and the accumulation time changes accordingly.

Hence, even when the variation width of the accumulation time remains the same, the frequency of accumulation control within a shorter accumulation time increases as compared to the conventional arrangement in which the accumulation time simply linearly changes in accordance with the luminance of incoming light to the image sensor. For this reason, in consideration of every light conditions, the average accumulation time can be shortened.

As an example of the accumulation control of the sensor device, Japanese Patent Laid-Open Application No. 63-246711 proposes a focus detection apparatus comprising an image sensor which has a plurality of focus detection zones and receives light transmitted through a photographing lens in units of focus detection zones, and a monitor means which is arranged in the vicinity of a light-receiving unit of the image sensor and monitors the amounts of light incident on the individual focus detection zones. In this apparatus, the corresponding received light output from the image sensor is controlled by controlling the accumulation time or signal gain in accordance with the output from the monitor means, and the focus adjustment state of the photographing lens is detected on the basis of the obtained received light output from the image sensor.

According to the contents of this patent application, pairs of the image sensors and monitor means are arranged in units of focus detection zones, and the image sensors are controlled based on the outputs from the monitor means. Hence, independently of conditional differences such as luminance differences of light received by the individual focus detection zones, the focus detection zones can be independently subjected to the control of the accumulation time and amplification of the received light outputs, and focus detection can be attained with higher precision in accordance with the received light outputs from the plurality of focus detection zones under every light conditions.

Since the function that the photographer requires of the focus detection apparatus is to adjust the focal point in an arbitrary area that the photographer was intended within the photographing frame, a focus detection apparatus having a larger number of focus detection areas than in the prior art is desired.

However, as has already been described above, in the conventional arrangement in which the focus detection areas, line sensors, and accumulation controllers have a one-to-one correspondence thereamong, the same number of accumulation controllers as that of line sensors is required. For this reason, an increase in the number of distance measurement points or distance measurement area poses problems such as a large circuit scale and large consumption power caused by the large circuit scale, a low yield, high cost, sense of low reliability felt by the user due to a short battery exchange period, and the like.

SUMMARY OF THE INVENTION

The present invention has been made to solve the above-mentioned problems and has as its object to realize focus detection using a larger number of focus detection areas (distance measurement points or areas) than the prior art without increasing the circuit scale by arranging the same number of accumulation controllers as that of pairs of line sensors.

In order to achieve the above object, according to one aspect of the present invention, an accumulation control device for a photoelectric conversion element, comprises accumulation control means comprising accumulation controllers, which are fewer than the number of photoelectric conversion element arrays, and independently perform accumulation control of the photoelectric conversion element arrays in units of arrays in accordance with accumulation monitor signals, and switching means for selectively switching the accumulation monitor signals to be supplied from the photoelectric conversion element arrays to the accumulation controllers.

According to another aspect of the present invention, an accumulation control device for a photoelectric conversion element, comprises a plurality of photoelectric conversion element arrays for receiving light beams from a plurality of areas corresponding to different object spaces and outputting accumulation monitor signals, accumulation control means having accumulation controllers, which are fewer than the number of photoelectric conversion element arrays, and perform accumulation control of the photoelectric conversion element arrays in units of arrays in accordance with the accumulation monitor signals output from the photoelectric conversion element arrays, and switching means for selectively switching the accumulation monitor signals to be supplied from the photoelectric conversion element arrays to the accumulation controllers of the accumulation control means.

According to still another aspect of the present invention, an accumulation control device for a photoelectric conversion element, which performs accumulation control of an area image sensor constituted by consecutively arranging, adjacent to each other, a plurality of photoelectric conversion elements that receive light beams from a plurality of areas corresponding to different object spaces and output accumulation monitor signals, comprises accumulation control means having accumulation controllers, which are fewer than the number of photoelectric conversion element arrays, and perform accumulation control in units arrays in accordance with the accumulation monitor signals output from the photoelectric conversion element arrays, and switching means for selectively switching the accumulation monitor signals to be supplied from the photoelectric conversion element arrays to the accumulation controllers, and the accumulation monitor signals output from the photoelectric conversion element arrays, equal to the number of the accumulation controllers, of the plurality of consecutive photoelectric conversion element arrays are selected by the switching means and are supplied to the accumulation controllers of the accumulation control means so as to perform the accumulation control.

According to still another aspect of the present invention, a focus detection apparatus using the above-mentioned accumulation control device for the photoelectric conversion element, comprises detection means for detecting a focus adjustment state of a photographing lens on the basis of a received light output obtained by receiving light beams from a plurality of areas corresponding to different object spaces via an imaging optical system to be subjected to focus detection.

According to one aspect of the present invention with the above arrangement, only accumulation monitor signals output from the photoelectric conversion element arrays selected by the switching means from the plurality of photoelectric conversion element arrays, the number of which is larger than the accumulation controllers, are input to the accumulation controllers to control the received light outputs of the photoelectric conversion element arrays.

Other objects and features of the present invention will become apparent from the following description of the specification taken in conjunction with the accompanying drawings.

DETAILED DESCRIPTION OF THE PREFERRED EMBODIMENTS

An accumulation control device for a photoelectric conversion element according to the first embodiment of the present invention will be described in detail hereinafter with reference to the accompanying drawings.

Figure 1:
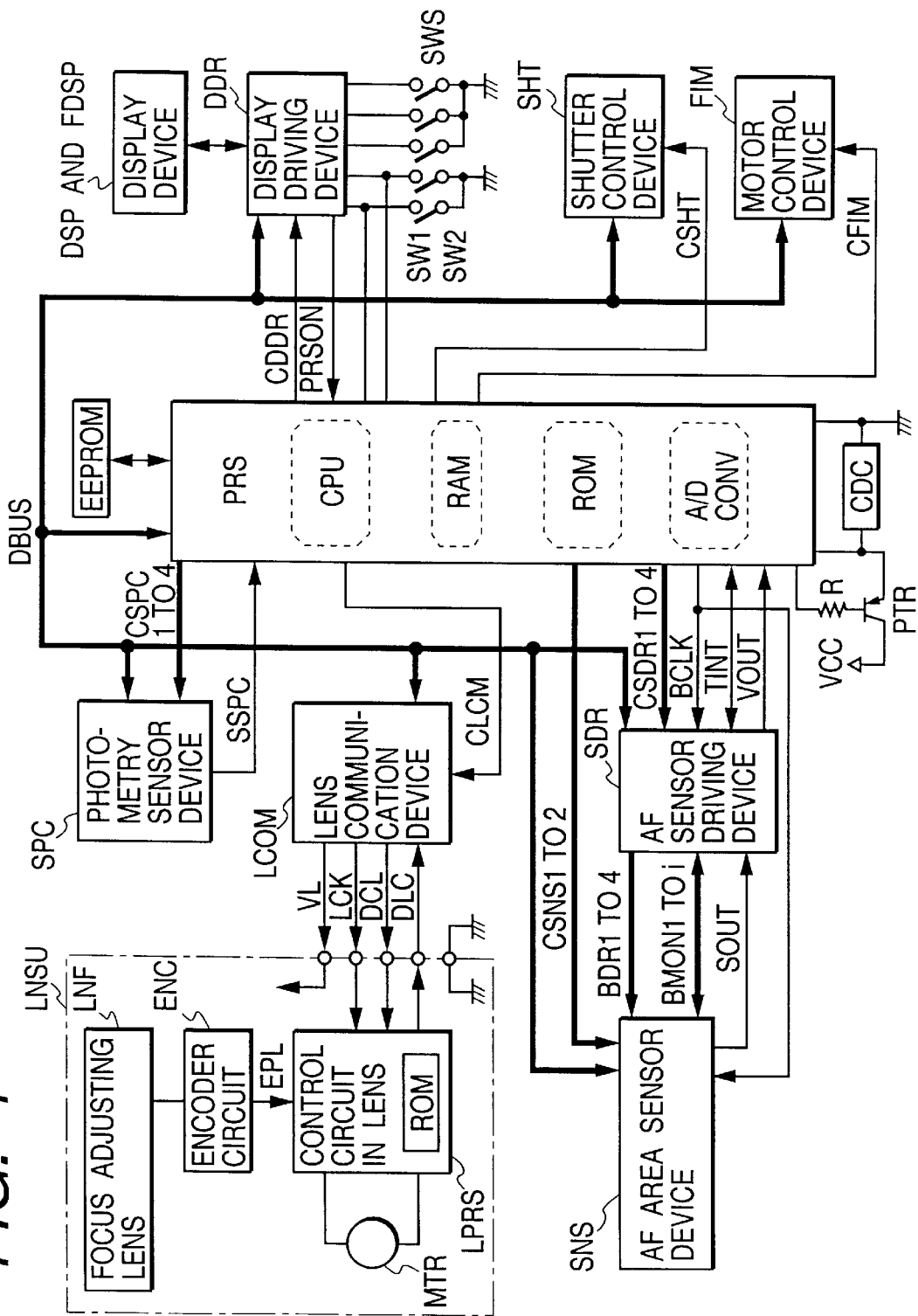
FIG. 1 is a block diagram showing the detailed arrangement of the first embodiment in which an accumulation control device for a photoelectric conversion element according to the present invention is built in a camera.

FIG. 1 is a block diagram showing the first embodiment in which an accumulation control device for a photoelectric conversion element according to the present invention is applied to a camera. The arrangements of the individual units will be explained below.

Referring to FIG. 1, a camera control circuit PRS comprises a one-chip microcomputer including, e.g., a CPU (central processing unit), RAM, ROM, A/D converter, I/O port, and the like.

An EEPROM (electrically erasable programmable ROM) connected to the control circuit PRS stores a series of camera control parameters including adjustment values and the like associated with exposure control and focus adjustment.

The control circuit PRS controls a series of operations of the camera such as automatic exposure control, automatic focus adjustment, film winding, film rewinding, and the like in accordance with the sequence program and control parameters stored in the ROM and EEPROM. For this purpose, the control circuit PRS communicates with peripheral circuits in the camera main body using a data bus DBUS to control the operations of the peripheral circuits and lens.

A shutter control device SHT is selected when a control signal SCHT supplied from the control circuit PRS is at low potential level (the low potential level will be abbreviated as "L" hereinafter; a high potential level will be abbreviated as "H" hereinafter), receives data input via the data bus DBUS, and controls travel of the front and rear curtains of a shutter (not shown) on the basis of the input data.

A motor control device FIM is selected when a control signal CFIM supplied from the control circuit PRS is "L", receives data input via the data bus DBUS, and controls a film feed mechanism and a main mirror up/down mechanism (neither are shown) comprising motors and the like on the basis of the input data.

Figure 3:
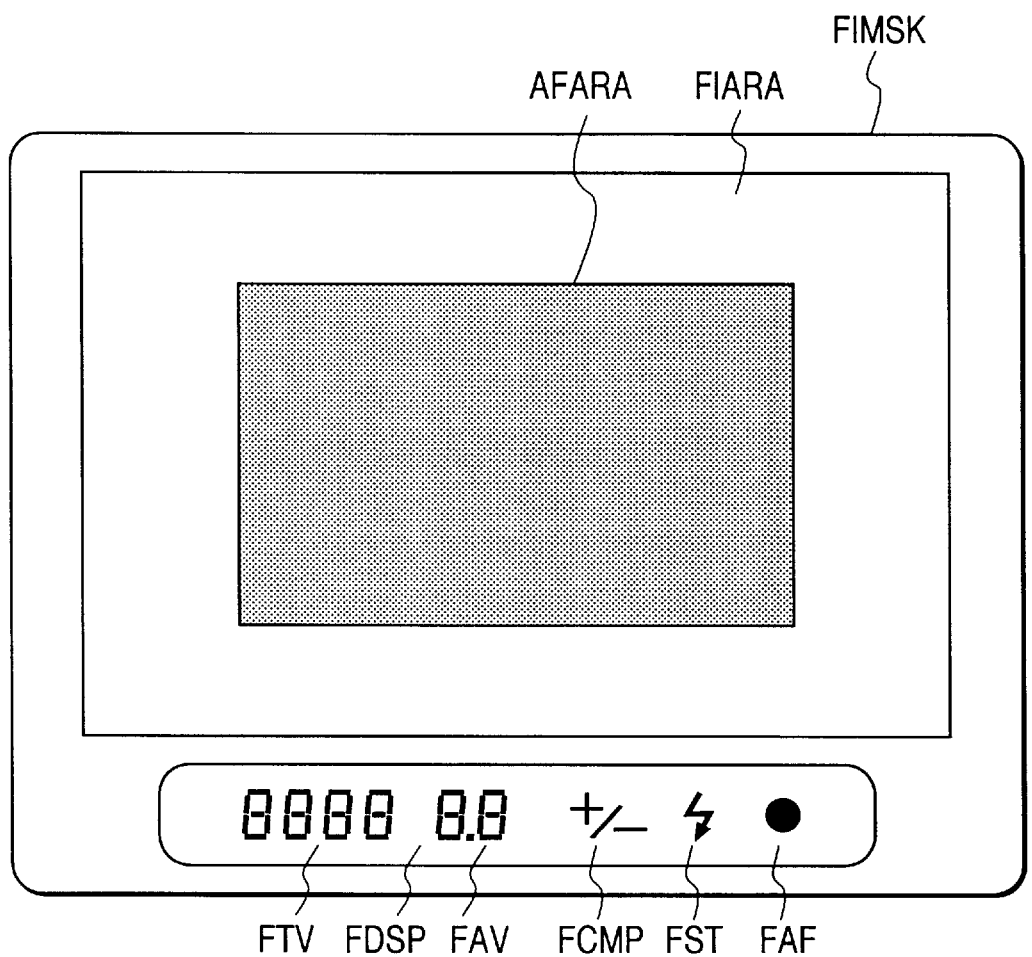
FIG. 3 is a view showing the finder field of the camera.

A switch detection & display driving device DDR is selected when a control signal CDDR supplied from the control circuit PRS is "L", and drives a display device DSP and ON/OFF controls a finder display device FDSP shown in FIG. 3 upon reception of data input via the data bus DBUS. Also, the device DDR detects the ON/OFF states of switches SW1 and SW2 interlocked with a release button (not shown), and switches SWS interlocked with various operation members such as operation mode setting buttons, and the like, and informs the control circuit PRS of ON/OFF events of the switches using a detection signal PRSON.

The switch detection & display driving device DDR detects the switch states without being influenced by chattering produced upon switching the ON/OFF states of the above switches SW1, SW2, and SWS.

As for the switches SW1 and SW2, the switch SW1 is turned on when the release button (not shown) is pressed down to its first stroke position (half pressed state), and the switch SW2 is turned on when the release button is subsequently pressed down to its second stroke position. The terminals of both the switches SW1 and SW2 on one side are grounded, and the terminals on the other side are parallelly connected to the terminals of the control circuit PRS. The terminals of the control circuit PRS, to which the switches SW1 and SW2 are connected are connected to the plus terminal of a battery (not shown) via a pull-up resistor (not shown).

A constant voltage power supply CDC receives a battery output (not shown). The output from the constant voltage power supply CDC is connected to the power supply terminal of the control circuit PRS, and to the switch detection & display driving device DDR although not shown. Also, the output from the constant voltage power supply is output to a terminal VCC via a transistor PTR under the control of the control circuit PRS, and thereafter, is supplied to the individual electrical elements. The terminal VCC is connected to all the electrical elements but such connections are not illustrated in FIG. 1.

Upon detection of the ON state of the switch SW1, the control circuit PRS pulls down the terminal connected to the transistor PTR via a resistor R to "L" level so as to turn on the transistor PTR. The control circuit PRS supplies electric power to the electrical elements, which have been kept OFF after an internal timer (not shown) measured an elapse of a predetermined period of time from the previous ON timing of the switch SW1, so as to start a series of control operations such as photometry, AF (auto-focusing), and the like. Also, the control circuit PRS resets the internal timer that performs power supply control to start time measurement.

Thereafter, when the internal timer has measured an elapse of the predetermined period of time, the control circuit PRS turns off the transistor PTR to stop power supply to the electrical elements. Furthermore, when the switch SW2 is turned on, the control circuit PRS performs exposure control and subsequent film winding in response to the ON event of the switch SW2 as a trigger.

A photometry sensor device SPC receives light coming from the object field via a photographing lens, and detects the luminance distribution of the object field area. For this purpose, the photometry sensor device SPC comprises a photometry sensor having a plurality of photometry areas that can individually measure light.

The photometry areas are selected by control signals CSPC1 to CSPC4 output from the control circuit PRS, and the photometry output from the selected area is supplied to the analog input terminal of the control circuit PRS as a photometry signal SSPC. The photometry signal SSPC is A/D-converted in the control circuit PRS, and is arithmetically processed in accordance with a program to obtain photometry data, which serves as stop control information to be transmitted to the shutter control device SHT and the photographing lens.

A driving device SDR for an AF area sensor device SNS has i accumulation controllers that can independently perform charge accumulation control, and performs a series of driving operations such as initialization, charge accumulation, and image signal reading of line sensors, which are selected in advance, in the AF area sensor device SNS in accordance with a driving mode selected in advance in synchronism with an operation reference clock BLCK supplied from the control circuit PRS. The functions of the AF sensor driving device SDR are selected in accordance with control signals CSDR1 to CSDR4 supplied from the control circuit PRS and the data contents input via the data bus DBUS.

The AF sensor driving device SDR performs two-way communications with the control circuit PRS via a signal line TINT to perform accumulation end control and detection of each of i line sensors selected from the AF area sensor device SNS. The AF sensor driving device SDR amplifies an image signal SOUT supplied from the AF area sensor device SNS with a gain based on the data contents received via the data bus DBUS, and outputs the amplified signal as a signal VOUT. The signal VOUT is input to the analog input terminal of the control circuit PRS. The control circuit PRS A/D-converts the input analog signal VOUT, and performs a series of AF processing and arithmetic operations on the basis of the converted digital value.

Driving signals BDR1 to BDR4 supplied from the AF sensor driving device SDR to the AF area sensor device SNS control the driving timings of initialization, charge accumulation, and image signal reading of i line sensors selected form the AF area sensor device SNS in accordance with their combinations.

Signal lines BMON1 to BMONi are used in two-way communications between the AF area sensor device SNS and the AF sensor driving device SDR. The signal lines BMON1 to BMONi respectively correspond to i line sensors selected from the AF area sensor device SNS. The AF area sensor device SNS generates and outputs an image signal SOUT corresponding to the amounts of light beams entering its line sensors.

The AF sensor driving device SDR detects whether or not one of the received light outputs (accumulation monitor signals) from the line sensors corresponding to the signal lines BMON1 to BMONi has reached a level designated in advance via the data bus DBUS. When one of the received light outputs has reached the designated level, the device SDR outputs an accumulation completion signal to the AF area sensor device SNS using the detected one of the signal lines BMON1 to BMONi, and also outputs it to the control circuit PRS using the signal lint TINT.

The AF area sensor device SNS is an area sensor having two light-receiving areas which are vertically aligned and each of which is defined by k pixels in the vertical direction and j pixels in the horizontal direction. Of the two light-receiving areas, two line sensors corresponding to one vertical array will be referred to as a pair of line sensors hereinafter. Initialization and charge accumulation of j pairs of line sensors are simultaneously done, and image signal reading driving is done in units of pairs of line sensors.

As described above, in this embodiment, charge accumulation control can be done in units of pairs of line sensors using accumulation monitor signals by connecting i pairs of line sensors selected from j pairs and the AF sensor driving device SDR. That is, the selected i pairs of line sensors are connected so that accumulation monitor signals output in units of pairs of line sensors are supplied to i accumulation controllers in the AF sensor driving device SDR that can independently perform accumulation control. Note that i is smaller than the number j of pairs of line sensors that build the AF area sensor device SNS.

The functions of the AF area sensor device SNS, e.g., selection of i pairs of line sensors to be driven by the AF sensor driving device SDR, and the like are selected in accordance with control signals CSNS1 and CSNS2 supplied from the control circuit PRS and the data contents input via the data bus DBUS. Note that the AF area sensor device SNS will be described in detail later with the aid of FIG. 4.

A lens communication device LCOM gives a lens power supply VL to a photographing lens unit LNSU during operation of the camera. The device LCOM receives data via the data bus DBUS during the "L" period of a signal CLCM supplied from the control circuit PRS, and makes serial communications with the photographing lens unit LNSU on the basis of the received data. More specifically, the lens communication device LCOM transmits lens driving data DCL to a control circuit LPRS in a lens (to be described later) in synchronism with a clock signal LCK, and at the same time, receives lens information DLC such as the maximum defocus amount and the like of the photographing lens (to be described later) from the control circuit LPRS in the lens.

The photographing lens unit LNSU comprises the LPRS in the lens, and drives a motor MTR on the basis of the serially input data DCL to move a focus adjusting photographing lens LNF. The control circuit LPRS in the lens has an internal ROM that stores information such as the maximum defocus amount, focal length, full-open F-number, and the like of the photographing lens LNF.

An encoder circuit ENC in the photographing lens unit LNSU detects a pulse signal generated upon movement of a lens barrel that holds the photographing lens LNF, and outputs an encoder pulse signal EPL as position information of the photographing lens LNF at that time to the control circuit LPRS in the lens.

The signal DCL input to the control circuit LPRS in the lens in synchronism with the clock signal LCK is command data supplied from the camera to the photographing lens unit LNSU, and the operations of the photographing lens are predetermined in correspondence with the commands. The control circuit LPRS in the lens interprets the commands in accordance with a predetermined procedure to attain focus adjustment and stop control, and informs operation status of the individual units of the lens (e.g., driving status of a focus adjustment optical system, driving status of a stop, and the like) using the signal DLC.

For example, when a focus adjustment command is sent from the camera, the control circuit LPRS drives the focus adjusting motor MTR in accordance with information of the driving amount and driving direction sent simultaneously with the command so as to move the focus adjustment optical system in the optical axis direction, thus achieving focus adjustment. The moving amount of the optical system is controlled as follows.

More specifically, pulse signals EPL output from the encoder circuit ENC which detects, using a photocoupler, the pattern of a pulse plate that pivots in synchronism with the optical system, and outputs pulses corresponding in number to the moving amount, are monitored, and are counted by an internal counter (not shown) of the control circuit LPRS in the lens. When the count value has matched the moving amount sent to the control circuit LPRS in the lens, the control circuit LPRS in the lens itself controls the motor MTR.

For this reason, once the focus adjustment command is sent from the camera to the photographing lens unit LNSU, the control circuit PRS in the camera need not participate in lens driving at all until driving of the photographing lens LNF is complete. The contents of the internal counter of the control circuit LPRS in the lens can be sent to the camera in response to a request from the camera, as needed.

Figure 2:
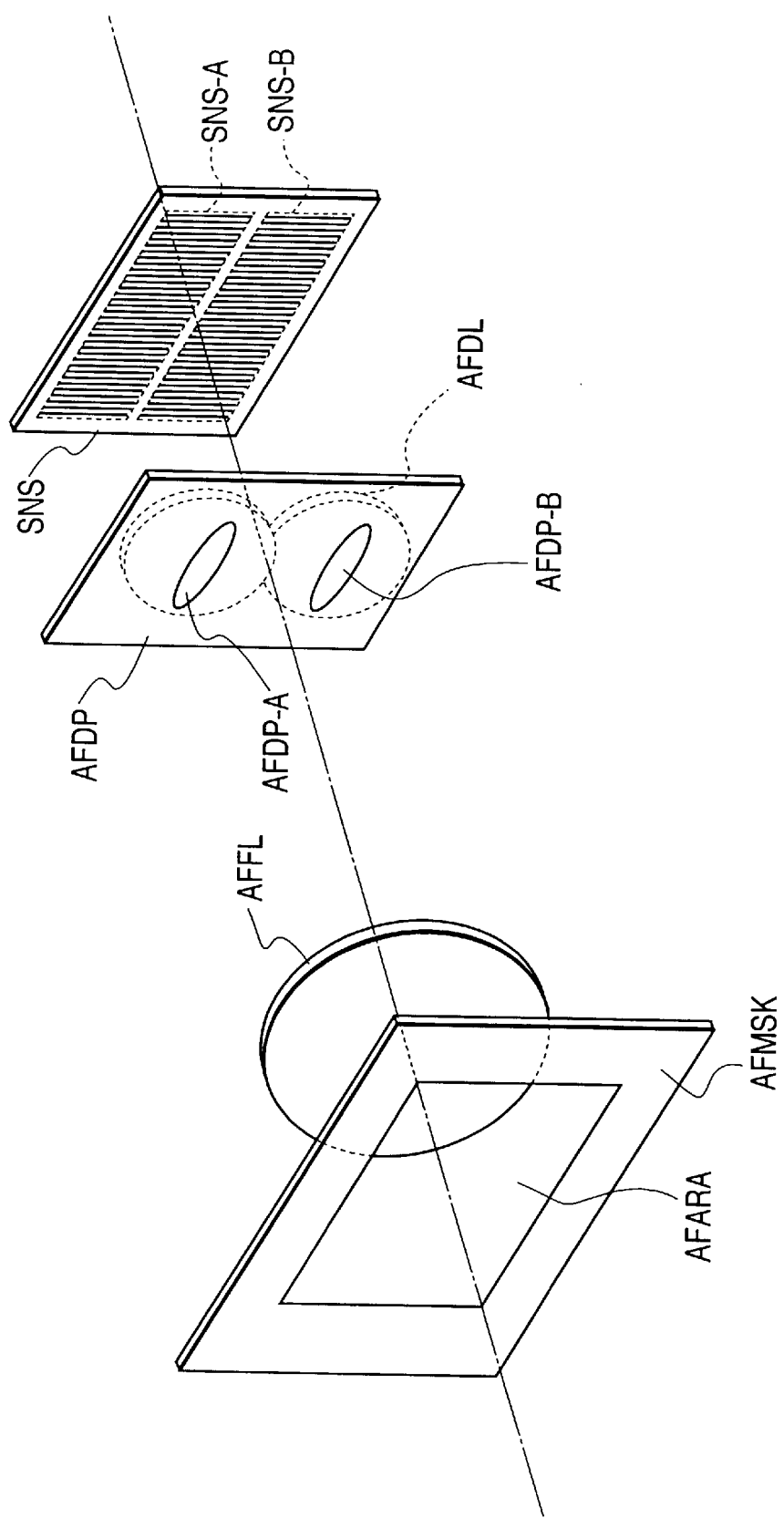
FIG. 2 is a perspective view showing an imaging optical system of a focus detection apparatus according to the first embodiment.
Figure 16:
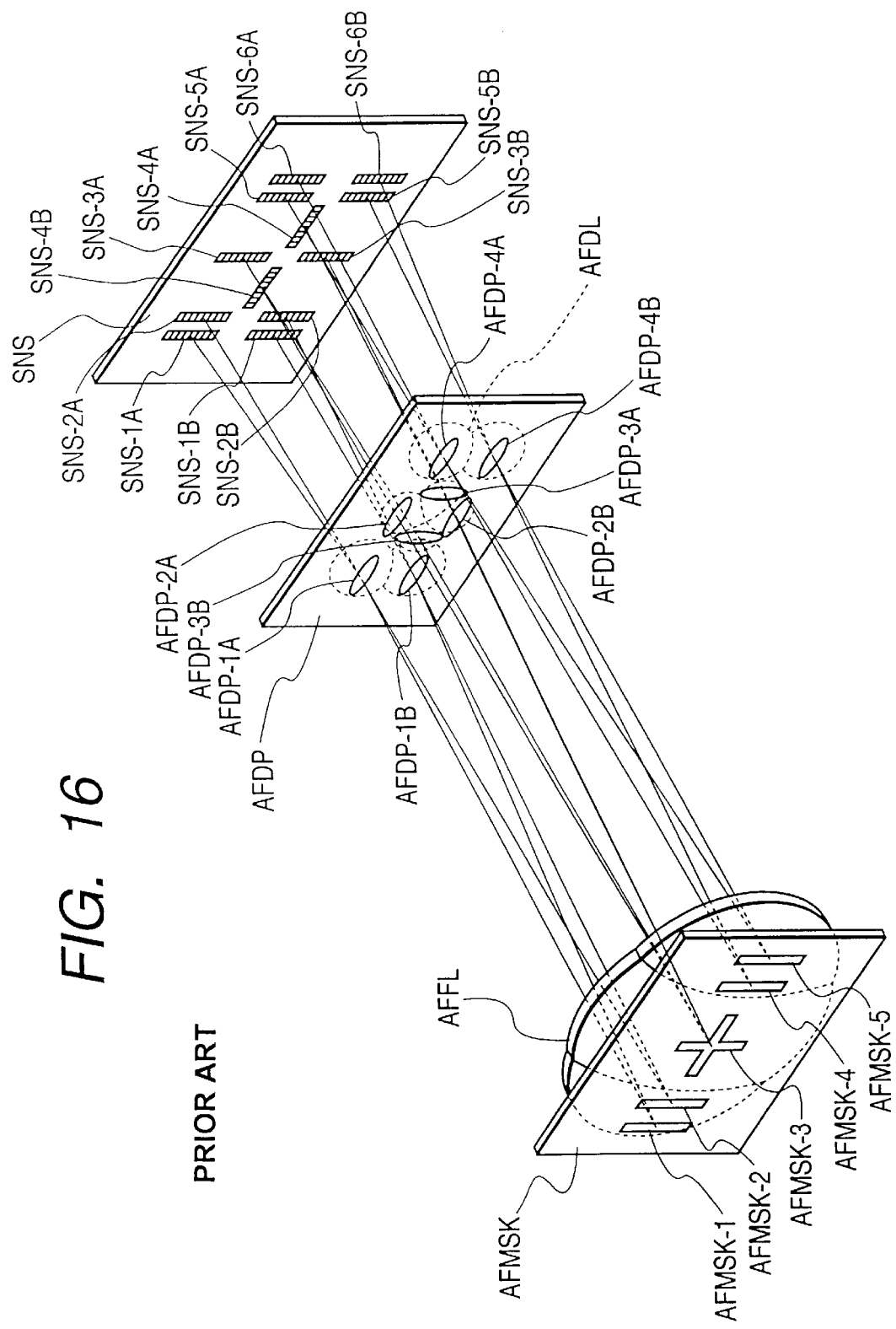
FIG. 16 is a perspective view showing an imaging optical system of a conventional focus detection apparatus.
Figure 17:
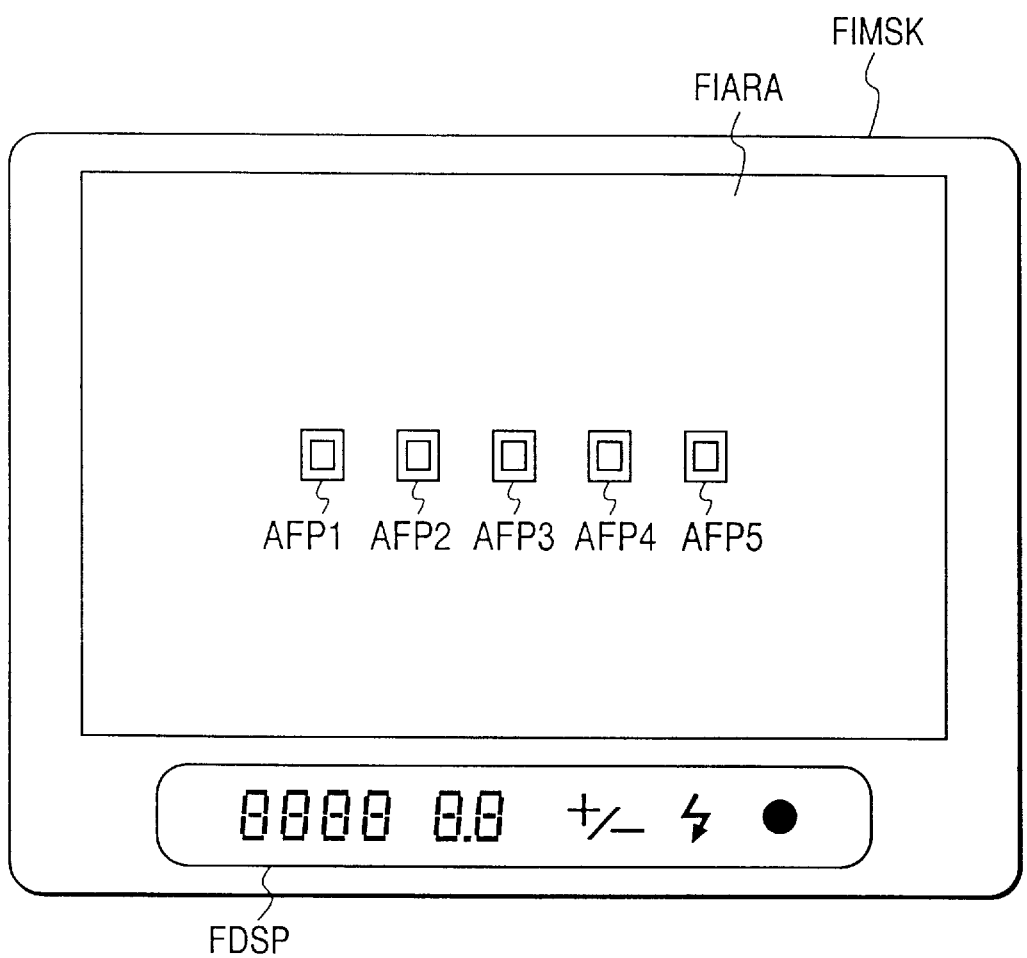
FIG. 17 is a view showing the finder field of a conventional camera.
Figure 18:
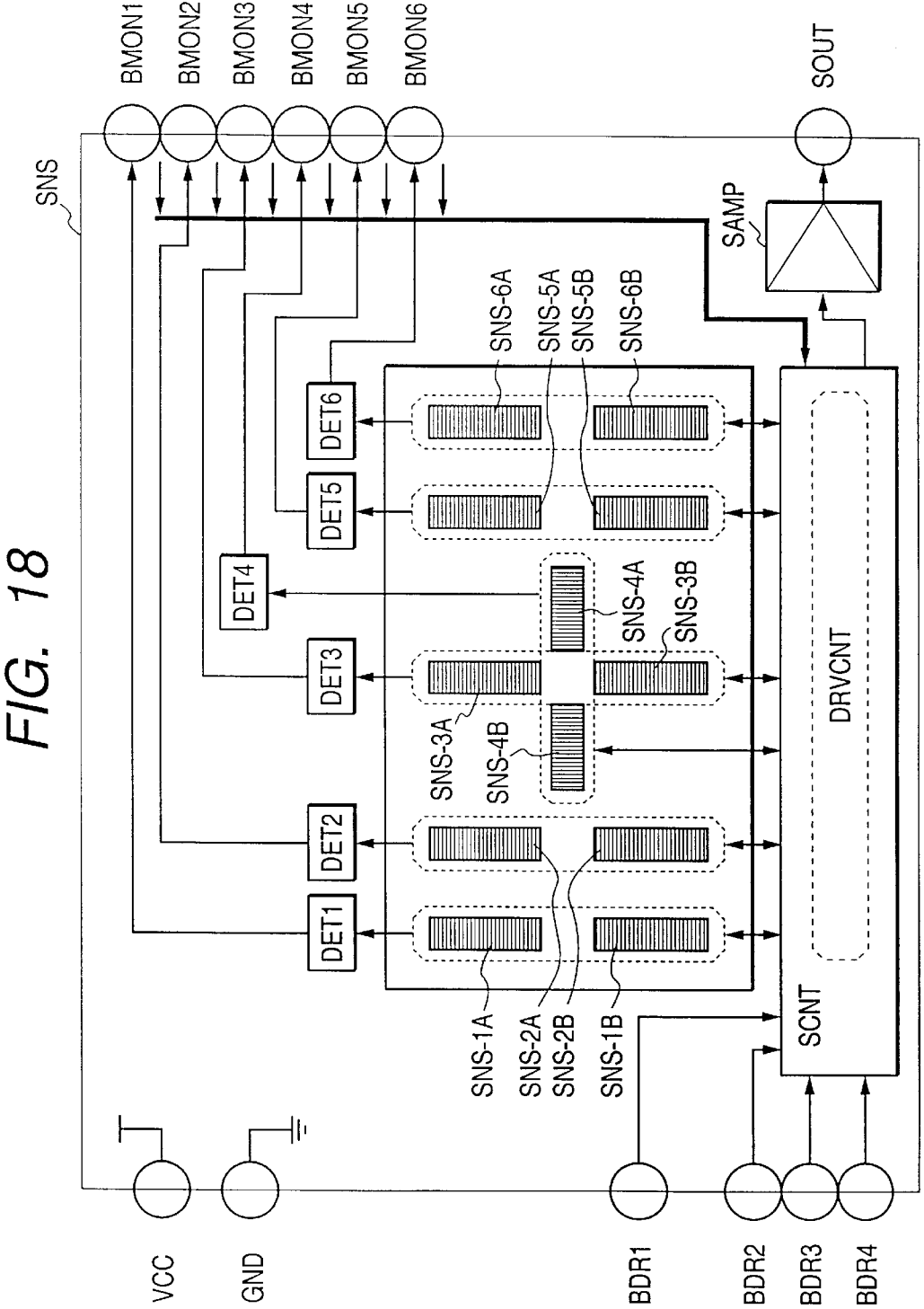
FIG. 18 is a block diagram showing an example of the arrangement of a conventional AF area sensor device.

The imaging optical system of a focus detection apparatus included in the camera of this embodiment will be described below with reference to FIG. 2. The imaging optical system shown in FIG. 2 is of phase difference type. The basic principle of this optical system is substantially the same as that of the above-mentioned prior art shown in FIG. 16, and the same reference numerals denote the same constituting members.

A field mask plate AFMSK is arranged at a position in the vicinity of the prospective imaging plane of a photographing objective lens (not shown). A portion inside a single, wide distance measurement field opening (slit) AFARA formed on the field mask plate AFMSK serves as a demarcated focus detection area. A pair of secondary imaging lenses AFDL consisting of two positive lenses re-form an object image demarcated by the slit AFARA on a pair of area sensors SNSA and SNSB.

Received light information on each of the pair of line sensors of the AF area sensor device SNS is read out as an electrical signal of local image information of the corresponding position. Based on the readout electrical signal, correlation arithmetic operations are done to calculate a value representing the focus adjustment state of the objective lens with respect to an object at the corresponding position.

A stop plate AFDP is placed in front of the secondary imaging lenses AFDL, and apertures AFDP-A and AFDP-B formed on the stop plate AFDP limit light beams that enter the two positive lenses. The stop plate AFDP is placed at the position of the exit pupil of the photographing objective lens to have a substantially imaging relationship due to the power of a field lens AFFL.

The AF area sensor device SNS may have either a single or split light receiving areas as long as predetermined controllability can be obtained. In general, since two-image separation is used, a boundary area which is not optically used is present between two optical images. Hence, if a peripheral circuit is formed on this portion, the chip area can be reduced.

The relationship between the areas to be subjected to focus detection by the AF area sensor device SNS and the finder field will be explained below with reference to FIG. 3. FIG. 3 shows the state observed when the photographer looks into the finder from an eyepiece (not shown) of the camera.

Referring to FIG. 3, a field mask FIMSK forms a finder field area, and the photographer can observe an object via the photographing lens attached to the camera within an observation area (photographing area) FIARA. The focus detection area in the finder field in the photographing area FIARA is equivalent to the slit AFARA shown in FIG. 2, and has the same name as the slit AFARA. In FIG. 3, the focus detection area AFARA is painted in black to allow easy understanding, but the photographer can observe an object via the attached photographing lens in practice.

The photographer selects an arbitrary area from the focus detection area AFARA. Note that the focus adjustment area can be selected by a known visual axis detection method, a manual method, or the like. In this embodiment, as compared to the prior art using at most six fixed distance measurement points, the distance measurement points can be selected more freely for focus adjustment. Also, in this embodiment, the above-mentioned processing can be realized by i accumulation controllers fewer than the number j of pairs of line sensors corresponding to the focus detection area AFARA. This processing will be described in turn hereinafter.

A finder LCD FDSP in FIG. 3 displays photographing information inside the finder, and lights the display portions of a shutter speed FTV, an aperture value FAV of the lens, an exposure correction value FCMP, a flash emission ready state FST, and a focus detection result FAF to display such information. FIG. 3 shows the lighted states of all the display portions for the purpose of explanation, and these display portions are switched on/off in correspondence with the operation state but are never simultaneously lighted unlike in FIG. 3.

The AF area sensor device SNS shown in FIG. 1 will be described in more detail below with reference to FIG. 4. Note that the line sensors that build the AF area sensor device SNS in this embodiment are different from known CCD sensors or MOS sensors, as described in the paragraphs of the prior art.

Figure 4:
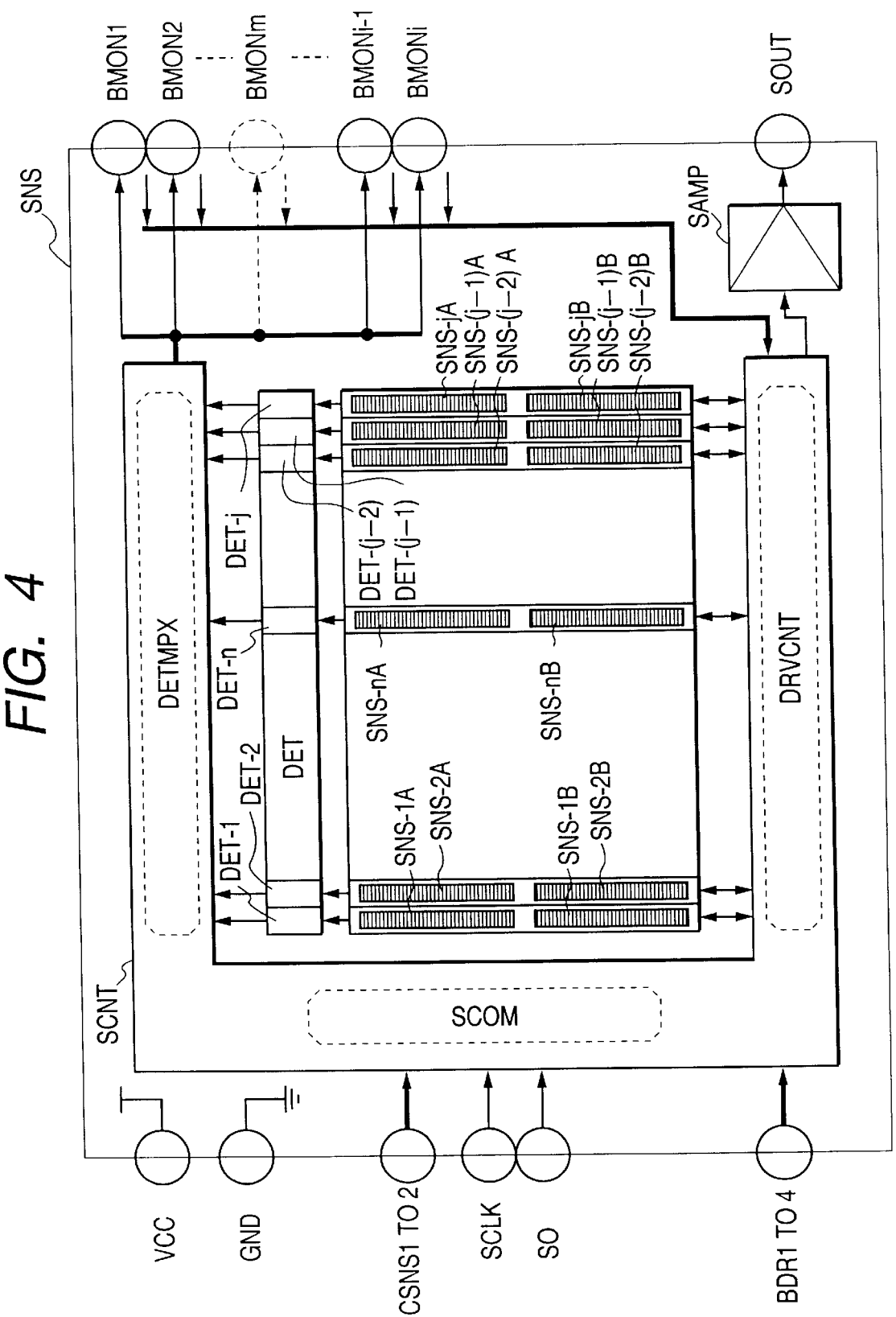
FIG. 4 is a block diagram showing an example of the detailed arrangement of an AF area sensor device SNS shown in FIG. 1.

The AF area sensor device SNS shown in FIG. 4 comprises j pairs of line sensors SNS-1A and SNS-1B to SNS-jA and SNS-jB which serve as the light-receiving elements of the focus detection apparatus, and are arranged on a single chip, a controller SCNT, an accumulation monitor signal output unit DET, and a signal amplifier unit SAMP. The control and driving for outputting the accumulation monitor signals, accumulating and reading out charges, and so on are done in units of pairs of line sensors.

The line sensors SNS-1A and SNS-1B to SNS-jA and SNS-jB are line sensors each obtained by continuously arranging a plurality of photoelectric conversion elements, and for example, the two line sensors SNS-1A and SNS-1B constitute a pair of line sensors. The same applies to other line sensors SNS-2A and SNS-2B to SNS-jA and SNS-jB. Charge signals output from the pairs of line sensors are input to a driving block DRVCNT in the controller SCNT.

The controller SCNT selects the accumulation monitor signals to be output, drives the pairs of line sensors, and selects the line sensors from which charges are to be read out, on the basis of signals supplied from the control circuit PRS and the AF sensor driving device SDR shown in FIG. 1. Note that communications between the controller SCNT and the control circuit PRS shown in FIG. 1 are made using three types of signals SCLK, SO, and CSNS1 and CSNS2. Of these signals, the signals SCLK and SO are transmitted via the data bus DBUS in FIG. 1.

The controller SCNT comprises three blocks, i.e., a communication block SCOM, a multiplexer DETMPX, and the driving block DRVCNT.

The communication block SCOM communicates with the control circuit PRS shown in FIG. 1 and supplies received information to the multiplexer DETMPX and the driving block DRVCNT.

The multiplexer DETMPX selects the pairs of line sensors to be accumulation-controlled on the basis of the information supplied from the communication block SCOM. More specifically, the multiplexer DETMPX switches its internal switches so that signals selected from j accumulation monitor signal output sections DET-1 to DET-j on the basis of the communication contents with the control circuit PRS are output onto signal lines selected from the signal lines BMON1 to BMONi as accumulation monitor signals. Note that the multiplexer DETMPX will be described in detail later. Note that the number of pairs of line sensors that can be selected is i, which is smaller than the number j of pairs of line sensors.

The driving block DRVCNT operates on the basis of driving signals BDR1 to BDR4 supplied from the AF sensor driving device SDR shown in FIG. 1. Initialization and start of accumulation of all the line sensors are simultaneously performed, and read driving is done in units of pairs of line sensors on the basis of information supplied from the communication block SCOM.

Input signals from the signal lines BMON1 to BMONi are those for instructing to transfer signals photoelectrically converted by the pairs of line sensors to a read driving unit (not shown) in the driving block DRVCNT, and these signals are effective for only the pairs of line sensors corresponding to the accumulation monitor signals which are output from the accumulation monitor signal output sections DET selected by the multiplexer DETMPX onto the signal lines BMON1 to BMONi.

Charge signal outputs of the pairs of line sensors read out by the driving block DRVCNT are input to the signal amplifier unit SAMP. The signal amplifier unit SAMP amplifies the input charge signals by a predetermined gain, and outputs them onto an image signal output line SOUT, thus removing the influences of disturbances such as noise.

The accumulation monitor signal output unit DET comprises j independent detection blocks, i.e., output blocks DET-1 to DET-j to have a one-to-one correspondence with the j pairs of line sensors. These output sections output accumulation monitor signals of the corresponding pairs of line sensors, and supply them to the multiplexer DETMPX.

Each accumulation monitor signal output block DET detects maximum and minimum output values from signals obtained from a plurality of photoelectric conversion elements that build the pair of line sensors, and outputs the difference between the two output values, i.e., a contrast component, as the accumulation monitor signal. For example, the output block DET-1 detects maximum and minimum values from the received light outputs from a plurality of photoelectric conversion elements that build the pair of line sensors SNS-1A and SNS-1B, and outputs the difference between the two output values, i.e., a contrast component, as the accumulation monitor signal.

Each accumulation monitor signal output block DET also performs processing for comparing the maximum output value with a predetermined saturation level to detect if the photoelectric conversion element is saturated. If it is detected that the photoelectric conversion element is saturated, the output block DET informs the AF sensor driving device SDR of such saturation via a corresponding one of the signal lines BMON1 to BMONi.

The signal lines BMON1 to BMONi are used in two-way signal communications between the AF area sensor device SNS and the AF sensor driving device SDR. More specifically, the AF area sensor device SNS selects output signals from the accumulation monitor signal output unit DET via the multiplexer DETMPX and outputs the selected signals onto the signal lines BMON1 to BMONi. Also, signals output from the AF sensor driving device SDR are input to the controller SCNT in the AF area sensor device SNS via the signal lines BMON1 to BMONi.

Figure 5:
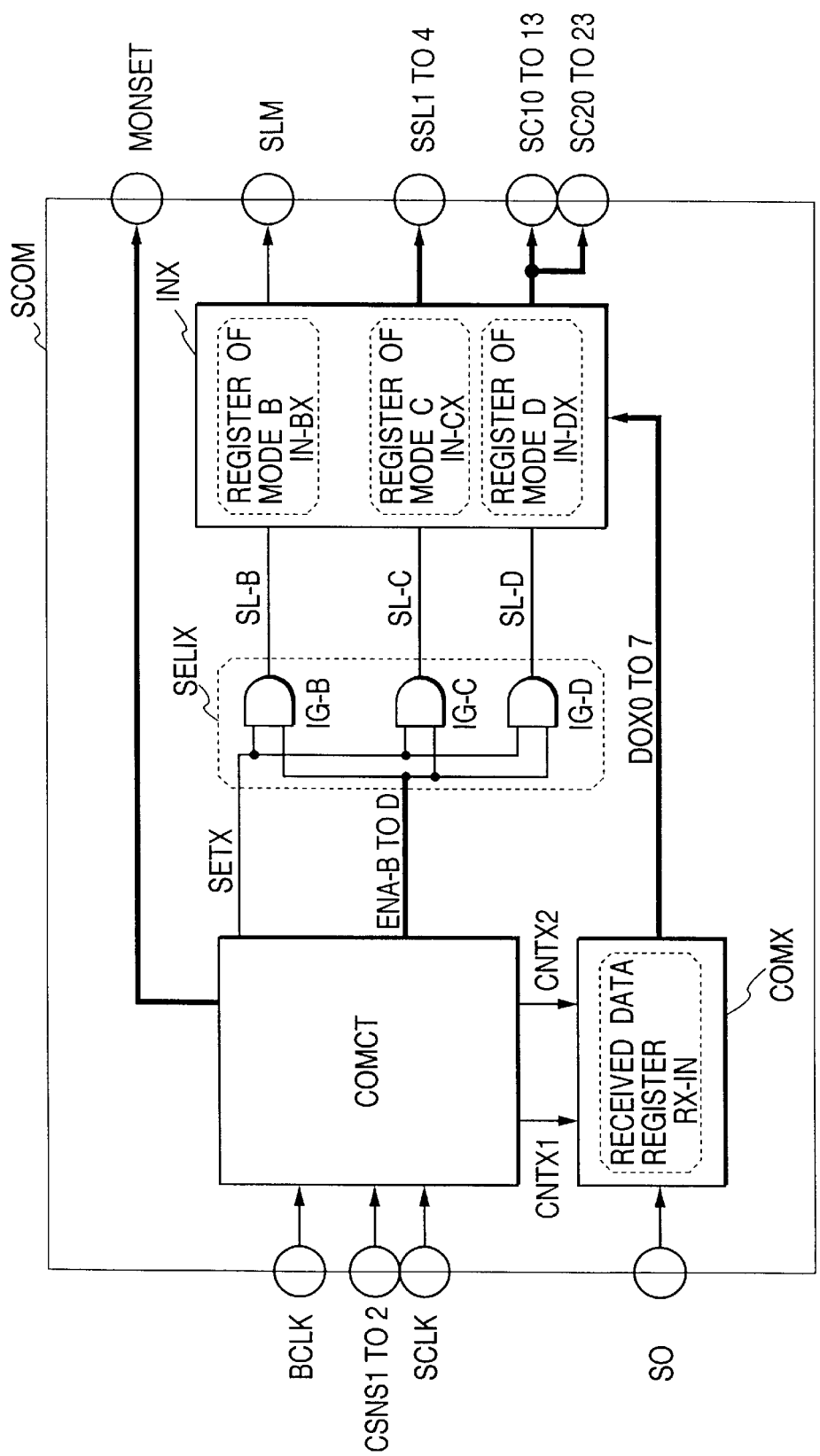
FIG. 5 is a block diagram showing an example of the detailed arrangement of a communication block SCOM shown in FIG. 4.

The communication block SCOM shown in FIG. 4 will be described in detail below with reference to FIG. 5. FIG. 5 is a block diagram showing the arrangement of the communication block SCOM.

As shown in FIG. 5, the communication block SCOM comprises a timing controller COMCT, a communication data register COMX, a transfer data register INX, and a received data storage destination selector SELIX.

The timing controller COMCT receives an operation reference clock BCLK, communication mode signals CSNS1 and CSNS2 from the control circuit PRS, and a communication clock SCLK, and outputs timing signals MONSET, SETX, ENA-B to ENA-D, CNTX1 and CNTX2 on the basis of these input signals. The communication clock SCLK and a signal SO are transmitted via the data bus DBUS shown in FIG. 1.

When one of the communication mode signals CSNS1 and CSNS2 is at "H" level, communications between the AF area sensor device SNS and the control circuit PRS are permitted. At this time, data SO received in synchronism with the communication clock SCLK is enabled. However, when an abnormal communication state is detected, e.g., when a predetermined number of clock pulses of the communication clock SCLK cannot be received during a single communication, that received data SO is disabled. A communication mode (to be described later) is selected depending on the combinations of the communication mode signals CSNS1 and CSNS2.

The communication data register COMX stores data SO sent in synchronism with the communication clock SCLK in its internal received data register RX-IN in accordance with the timing signal CNTX1. When a normal communication state is detected, the timing controller COMCT outputs the transfer signal CNTX2. In accordance with this signal, the contents of the internal received data register RX-IN of the communication data register COMX are transferred to the transfer data register INX.

The transfer data register INX comprises three registers IN-BX, IN-CX, and IN-DX so that it can store the contents of the received data register RX-IN in correspondence with the communication modes. The register IN-BX stores data SO received in communication mode B. Similarly, the register IN-CX stores data SO received in mode C, and the register IN-DX data SO received in mode D.

The received data storage destination selector SELIX selects the storage destination of the received data SO, and comprises three AND gates IG-B to IG-D.

When the timing controller COMCT receives a predetermined number of operation reference clocks BCLK after the communications are complete, it sets one of the signals ENA-B to ENA-D at "H" level. The signals ENA-B to ENA-D are those corresponding to communication modes B to D. For example, immediately after communications in communication mode B, the signal ENA-B is set at "H" level.

Subsequently, when the signal SETX changes to "H" level during a period of predetermined clocks, one of output signals SL-B to SL-D from the AND gates IG-B to IG-D changes to "H" level to select one of the storage destination registers in the transfer data register INX. In this manner, the data contents in the received data register RX-IN are transferred to the register corresponding to the communication mode in the transfer data register INX.

More specifically, in communication mode B, the signal ENA-B changes to "H" level. Subsequently, when the signal SETX changes to "H" level, the output signal SL-B from the AND gate IG-B changes to "H" level. As a result, since the signal SL-B is used to select the register IN-BX in the transfer data register INX, 1-byte data SO stored in the received data register RX-IN is stored in the register IN-BX as signals DOX0 to DOX7 in units of bits.

The data SO stored in the register IN-BX is output to the multiplexer DETMPX and the driving block DRVCNT shown in FIG. 4. The contents of the register IN-BX are held until the next data reception. Note that the contents of the data SO vary depending on the communication modes, and are information for selecting some operation modes prepared in advance in the AF area sensor device SNS.

The communication modes and communication contents of the AF area sensor device SNS will be explained below.

The operation of the AF area sensor device SNS is set on the basis of the contents of 1-byte received data SO synchronous with the communication clock SCLK. The AF area sensor device SNS has four different reception modes selected in accordance with the signal states of two signals CSNS1 and CSNS2 exchanged with the control circuit PRS, and switches the contents of the received data SO in correspondence with the communication modes. Table 1 shows the contents of the data SO.

Mode D is selected by setting CSNS1="1" and CSNS2="1". In mode D, signals SC23 to SC20 are input to upper 4 bits, and signals SC13 to SC10 are input to lower 4 bits. These signals SC23 to SC20 and SC13 to SC10 are information for selecting accumulation monitor signals to be output to the signal lines BMON1 to BMON16 (i=16 in this case), and are used upon setting an address.

Upon setting an address, the address is selected in communication mode C, and the line sensor to be set is selected in communication mode D. Finally, when communication mode B is started by setting SLM="1", predetermined address setting is complete. Note that the storage information of the SLM in the register IN-BX shown in FIG. 5 is initialized to contents SLM="0" upon completion of one address setting operation.

Since addresses 1 to 16 can be set, the above-mentioned operation is repeated 16 times to set all the addresses. When communication mode C is executed while the register IN-BX stores SLM="0", the address of the line sensor which is to be driven to read out a charge signal is selected.

The multiplexer DETMPX shown in FIG. 4 will be described in detail below with reference to FIGS. 6 and 7 and Tables 2 and 3.

Figure 6:
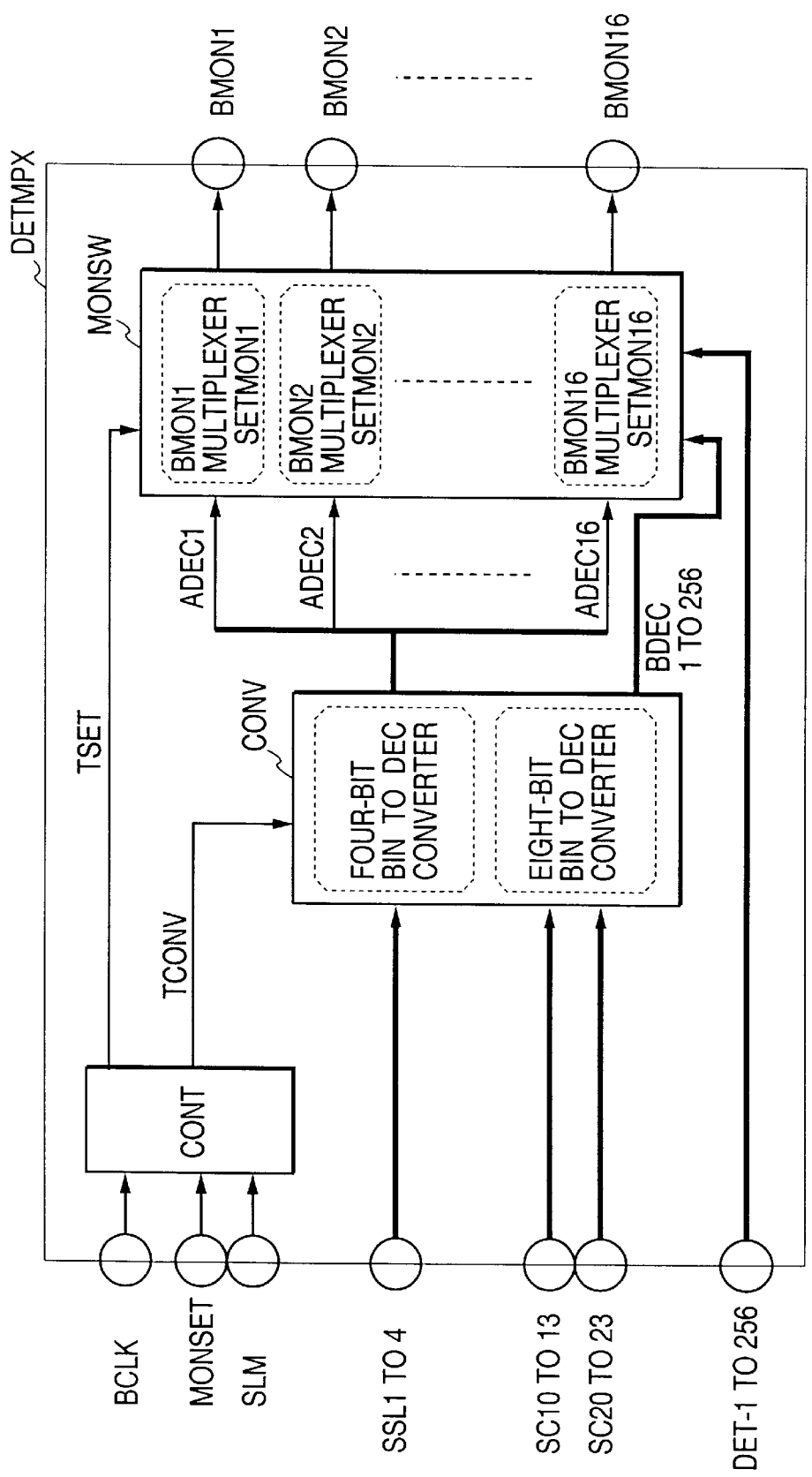
FIG. 6 is a block diagram showing an example of the detailed arrangement of a multiplexer DETMPX shown in FIG. 4.
Figure 7:
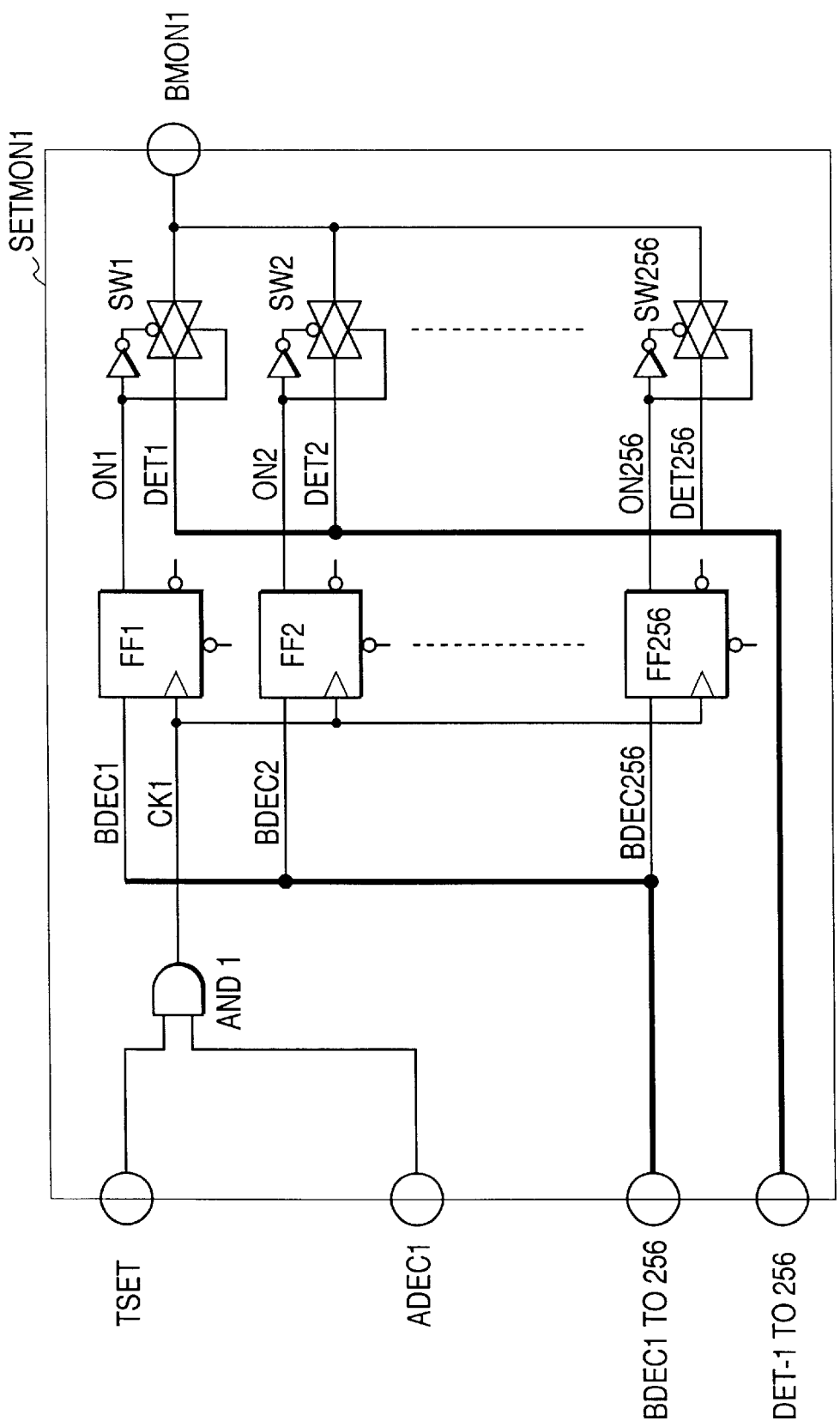
FIG. 7 is a block diagram showing an example of the detailed arrangement of a monitor output setting block MONSW shown in FIG. 6.

FIG. 6 is a block diagram showing the arrangement of the multiplexer DETMPX, and FIG. 7 shows the arrangement of a block MONSW in FIG. 6 in detail. Tables 2 and 3 show the contents of communication data SO.

TABLE 1

| Communication Mode | | ←MSB | | | | | | | LSB → |
|---|---|---|---|---|---|---|---|---|---|
| CSNS2 | CSNS1 | DO7 | DO6 | DO5 | DO4 | DO3 | DO2 | DO1 | DO0 |
| A | 0 | 0 | | | | DO NOT CARE | | | |
| B | 0 | 1 | SLM | | | | | | |
| C | 1 | 0 | | | | | SSL4 | SSL3 | SSL2 | SSL1 |
| D | 1 | 1 | SC23 | SC22 | SC21 | SC20 | SC13 | SC12 | SC11 | SC10 |

In Table 1, the received data SO is 8-bit information, and is expressed by DO0 (LSB) to DO7 (MSB).

In mode A in which CSNS1="0" and CSNS2="0", the other party is not the AF area sensor device SNS. That is, the AF area sensor SNS is not selected as the communication destination by the control circuit PRS. Hence, in mode A, the AF area sensor device SNS receives neither the communication clock SCLK nor data SO.

Note that CSNS1 and CSNS2 are the above-mentioned communication mode signals and are set at one of "H" and "L" levels, which have equivalent expressions "H""1" and "L"="0". In the following description of Tables 1 to 5, other signals including the communication mode signals CSNS1 and CSNS2 are expressed by "1" or "0".

Mode B is selected by setting CSNS1="1" and CSNS2="0". The most significant bit SLM of the data SO received in this mode B is a bit for setting the output of the accumulation monitor signal, and is set when communications with SLM="1" are complete.

Mode C is selected by setting CSNS1="0" and CSNS2="1". In mode C, signals SSL4 to SSL1 are input to lower 4 bits. These signals SSL4 to SSL1 define an address for specifying the line sensor to be subjected to the accumulation control and reading control. These address signals SSL4 to SSL1 are also supplied to the driving block DRVCNT shown in FIG. 4, which drives the line sensor selected by these address signals SSL4 to SSL1 to read out a charge signal.

FIG. 6 will be described below. As shown in FIG. 6, the multiplexer DETMPX comprises three blocks, i.e., a count block CONT, a conversion block CONV, and a monitor output setting block MONSW.

The count block CONT outputs two signals TCONV and TSET on the basis of signals MONSET and SLM sent from the communication block SCOM in FIG. 4, and the operation reference clock BCLK. Note that the signal TCONV is a timing signal for the conversion block CONV, and the signal TSET is a timing signal for the monitor output setting block MONSW.

The count block CONT outputs the signal TCONV to the conversion block CONV a period corresponding to the predetermined number of operation reference clocks BCLK after reception of the signal MONSET, and outputs the signal TSET to the monitor output setting block MONSW a period corresponding to another predetermined number of clocks thereafter.

The conversion block CONV has two converters each for converting a binary value into a decimal value, and operates in synchronism with the signal TCONV supplied from the count block CONT. One of the two converters is a 4-bit input converter, which converts the address signals SSL1 to SSL4 input from the above-mentioned communication block SCOM into a decimal signal, and outputs it onto signal lines ADEC1 to ADEC16. One of the signal lines ADEC1 to ADEC16 corresponding to the converted decimal value changes to "H" level.

Note that FIG. 6 illustrates the flows of the address signals SSL1 to SSL4 and the monitor output selection signals SC10 to SC13 and SC20 to SC23 by one line each. Also, the signal lines ADEC1 to ADEC16 are partially expressed by one line, but the signal lines ADEC1 and ADEC2 are independent signal lines respectively input to multiplexers SETMON1 and SETMON2. Similarly, other signal lines ADEC3 to ADEC16 are independently input to multiplexers SET-MON3 to SETMON16.

The other converter is an 8-bit input converter, which converts the signals SC10 to SC13 and SC20 to SC23 input from the above-mentioned communication block SCOM into a decimal signal, and outputs it onto signal lines BDEC1 to BDEC256. In this case, one of the signal lines BDEC1 to BDEC256 corresponding to the converted decimal value changes to "H" level. Note that these signal lines BDEC1 to BDEC256 and the flow of the signals from the accumulation monitor signal output blocks DET-1 to DET-256 shown in FIG. 4 are expressed by one line each, but they are a plurality of independent signal lines.

The monitor output setting block MONSW comprises 16 multiplexer blocks SETMON1 to SETMON16 having the same arrangement, and has a function of setting to output an analog signal obtained from one of the accumulation monitor signal output blocks DET-1 to DET-256 to one of the signal lines BMON1 to BMON16 in synchronism with the signal TSET. The signal TSET is parallelly input to the 16 multiplexer blocks SETMON1 to SETMON16. The signal lines BDEC1 to BDEC256 and DET-1 to DET-256 are commonly input to the 16 multiplexer blocks SETMON1 to SETMON16.

The monitor output setting block MONSW will be described in detail below with reference to FIG. 7 while taking the multiplexer block SETMON1 as an example.

FIG. 7 is a block diagram showing the multiplexer block SETMON1. The multiplexer block SETMON1 is a multiplexer for setting to output one of analog signals supplied from the accumulation monitor signal output blocks DET-1 to DET-256 to the signal line BMON1.

This setting is done in synchronism with the leading edge of a signal CK1. The signal CK1 is parallelly input to 256 flip-flops FF1 to FF256, and changes to "H" level via AND gate 1 when both the signal TSET supplied from the count block CONT in FIG. 6 and the signal ADEC1 supplied from one converter in the conversion block CONV are at "H" level. In synchronism with the change in signal CK1 from "L" to "H" level, the signals BDEC1 to BDEC256 supplied from the other converter in the conversion block CONV are output onto signal lines ON1 to ON256 via the flip-flops FF1 to FF256, respectively.

As for the analog signals output from the accumulation monitor signal output blocks DET-1 to DET-256, the output signal from the first output block DET-1 is input to a first analog switch SW1, the output signal from the second output block DET-2 to the analog switch SW2, and similarly, the output signals from the third to 256th output blocks DET-3 to DET-256 respectively to analog switches SW3 to SW256.

The analog switches SW1 to SW256 are turned on when one of the output signals from the flip-flops FF1 to FF256 corresponding to the signal lines ON1 to ON256 is at "H" level. In this case, one of the signal lines ON1 to ON256 changes to "H" level to prevent more than one analog switches from being simultaneously turned on.

As for the signals BDEC1 to BDEC256 supplied from the other converter in the conversion block CONV, the signal BDEC1 is input to the first flip-flop FF1, the signal BDEC2 to the second flip-flop FF2, and similarly, the signals BDEC3 to BDEC256 respectively to the third to 256th flip-flops FF3 to FF256.

More specifically, the first multiplexer block SETMON1 shown in FIG. 7 performs setting when the signal ADEC1 is at "H" level, and based on one "H"-level input of the signals BDEC1 to BDEC256, a corresponding one of the signal lines ON1 to ON256 changes to "H" level. Then, a corresponding one of the analog switches SW1 to SW256 is turned on to output a corresponding one of the signals DET-1 to DET-256 onto the signal line BMON1.

Likewise, the second multiplexer block SETMON2 is selected by the signal ADEC2 and performs output setting onto the signal line BMON2. The same applies to other multiplexer blocks SETMON3 to SETMON16.

Tables 2 and 3 below show the relationship between the input and output signals of the multiplexer DETMPX shown in FIG. 6. Table 2 shows the relationship among the signals SSL1 to SSL4, signals ADEC1 to ADEC16, and the signal lines BMON1 to BMON16, and Table 3 shows the relationship among the signals SC10 to SC13 and SC20 to SC23, signals BDEC1 to BDEC256, and signals DET-1 to DET-256.

TABLE 2

| SSL4 | SSL3 | SSL2 | SSL1 | CONV Output Signal | Output Destination to be Selected |
|---|---|---|---|---|---|
| 0 | 0 | 0 | 0 | ADEC1 | BMON1 |
| 0 | 0 | 0 | 1 | ADEC2 | BMON2 |
| 0 | 0 | 1 | 0 | ADEC3 | BMON3 |
| 0 | 0 | 1 | 1 | ADBC4 | BMON4 |
| 0 | 1 | 0 | 0 | ADEC5 | BMON5 |
| 0 | 1 | 0 | 1 | ADEC6 | BMON6 |
| 0 | 1 | 1 | 0 | ADEC7 | BMON7 |
| 0 | 1 | 1 | 1 | ADEC8 | BMON8 |
| 1 | 0 | 0 | 0 | ADEC9 | BMON9 |
| 1 | 0 | 0 | 1 | ADBC10 | BMON10 |
| 1 | 0 | 1 | 0 | ADBC11 | BMON11 |
| 1 | 0 | 1 | 1 | ADEC12 | BMON12 |
| 1 | 1 | 0 | 0 | ADEC13 | BMON13 |
| 1 | 1 | 0 | 1 | ADEC14 | BMON14 |
| 1 | 1 | 1 | 0 | ADEC15 | BMON15 |
| 1 | 1 | 1 | 1 | ADEC16 | BMON16 |

TABLE 3

| SC23 | SC22 | SC21 | SC20 | SC13 | SC12 | SC11 | SC10 | CONV Output Signal | Monitor Signal to be Selected |
|---|---|---|---|---|---|---|---|---|---|
| 0 | 0 | 0 | 0 | 0 | 0 | 0 | 0 | BDEC1 | DET-1 |
| 0 | 0 | 0 | 0 | 0 | 0 | 0 | 1 | BDEC2 | DET-2 |
| 0 | 0 | 0 | 0 | 0 | 0 | 1 | 0 | BDEC3 | DET-3 |
| 0 | 0 | 0 | 0 | 0 | 0 | 1 | 1 | BDEC4 | DET-4 |
| 0 | 0 | 0 | 0 | 0 | 1 | 0 | 0 | BDEC5 | DET-5 |

TABLE 3-continued

| SC23 | SC22 | SC21 | SC20 | SC13 | SC12 | SC11 | SC10 | CONV Output Signal | Monitor Signal to be Selected |
|---|---|---|---|---|---|---|---|---|---|
| 0 | 0 | 0 | 0 | 0 | 1 | 0 | 1 | BDEC6 | DET-6 |
| 0 | 0 | 0 | 0 | 0 | 1 | 1 | 0 | BDEC7 | DET-7 |
| 0 | 0 | 0 | 0 | 0 | 1 | 1 | 1 | BDEC8 | DET-8 |
| 0 | 0 | 0 | 0 | 1 | 0 | 0 | 0 | BDEC9 | DET-9 |
| 0 | 0 | 0 | 0 | 1 | 0 | 0 | 1 | BDEC10 | DET-10 |
| 0 | 0 | 0 | 0 | 1 | 0 | 1 | 0 | BDEC11 | DET-11 |
| 0 | 0 | 0 | 0 | 1 | 0 | 1 | 1 | BDEC12 | DET-12 |
| 0 | 0 | 0 | 0 | 1 | 1 | 0 | 0 | BDEC13 | DET-13 |
| 0 | 0 | 0 | 0 | 1 | 1 | 0 | 1 | BDEC14 | DET-14 |
| 0 | 0 | 0 | 0 | 1 | 1 | 1 | 0 | BDEC15 | DET-15 |
| 0 | 0 | 0 | 0 | 1 | 1 | 1 | 1 | BDEC16 | DET-16 |
| 0 | 0 | 0 | 1 | 0 | 0 | 0 | 0 | BDEC17 | DET-17 |
| | to | | | | to | | | to | to |
| 0 | 0 | 0 | 1 | 1 | 1 | 1 | 1 | BDEC32 | DET-32 |
| 0 | 0 | 1 | 0 | 0 | 0 | 0 | 0 | BDEC33 | DET-33 |
| | to | | | | to | | | to | to |
| 0 | 0 | 1 | 0 | 1 | 1 | 1 | 1 | BDEC48 | DET-48 |
| | to | | | | to | | | to | to |
| 1 | 1 | 1 | 0 | 0 | 0 | 0 | 0 | BDEC225 | DET-225 |
| | to | | | | to | | | to | to |
| 1 | 1 | 1 | 0 | 1 | 1 | 1 | 1 | BDEC240 | DET-240 |
| 1 | 1 | 1 | 1 | 0 | 0 | 0 | 0 | BDEC241 | DET-241 |
| | to | | | | to | | | to | to |
| 1 | 1 | 1 | 1 | 1 | 1 | 1 | 1 | BDEC256 | DET-256 |

Table 2 will be explained first. In Table 2, when, for example, the signals SSL1 to SSL4 are all "0", i.e., "L" level, the converted decimal value is "0", and the signal ADEC1 alone changes to "H" level. Similarly, when the signal SSL1 alone is at "H" level, the converted decimal value is "1", and the signal ADEC2 alone changes to "H" level. Also, when the converted decimal value is "2", the signal ADEC3 alone changes to "H" level, and when the converted decimal value is "15", the signal ADEC16 alone changes to "H" level.

Furthermore, when the signal ADEC1 is at "H" level, one of the accumulation monitor signals DET-1 to DET-256 selected by the signals BDEC1 to BDEC256 is output onto the signal line BMON1. Analogously, when the signal ADEC2 is at "H" level, an accumulation monitor signal is output onto the signal line BMON2, and when the signal ADEC16 is at "H" level, an accumulation monitor signal is output onto the signal line BMON16.

Next, Table 3 will be explained below. In Table 3, for example, when the signals SC10 to SC13 and SC20 to SC23 are all "0", the converted decimal value is "1", and the signal BDEC1 alone changes to "H" level. Similarly, when the signal SC10 alone is "1", the converted decimal value is "1", and the signal BDEC2 alone changes to "H" level. When only the signals SC10 and SC11 are "1", the converted decimal value is "2", and the signal BDEC4 alone changes to "H" level. If the converted decimal value is "255", only the signal BDEC256 changes to "H" level.

More specifically, the multiplexer DETMPX shown in FIG. 6 selects the signals SSL1 to SSL4 to obtain a converted decimal value "0" and an "H"-level signal ADEC1, and selects the signals SC10 to SC13 and SC20 to SC23 to obtain a converted decimal value "10", thereby setting to output the accumulation monitor signal DET-11 onto the signal line BMON1 via the multiplexer block SETMON1. On the other hand, the multiplexer block SETMON2 is set to obtain a converted decimal value "1" using the signals SSL1 to SSL4. The same applies to other multiplexer blocks SETMON3 to SETMON16.

The operation of the multiplexer DETMPX shown in FIG. 6 will be explained below with reference to FIG. 8.

Figure 8:
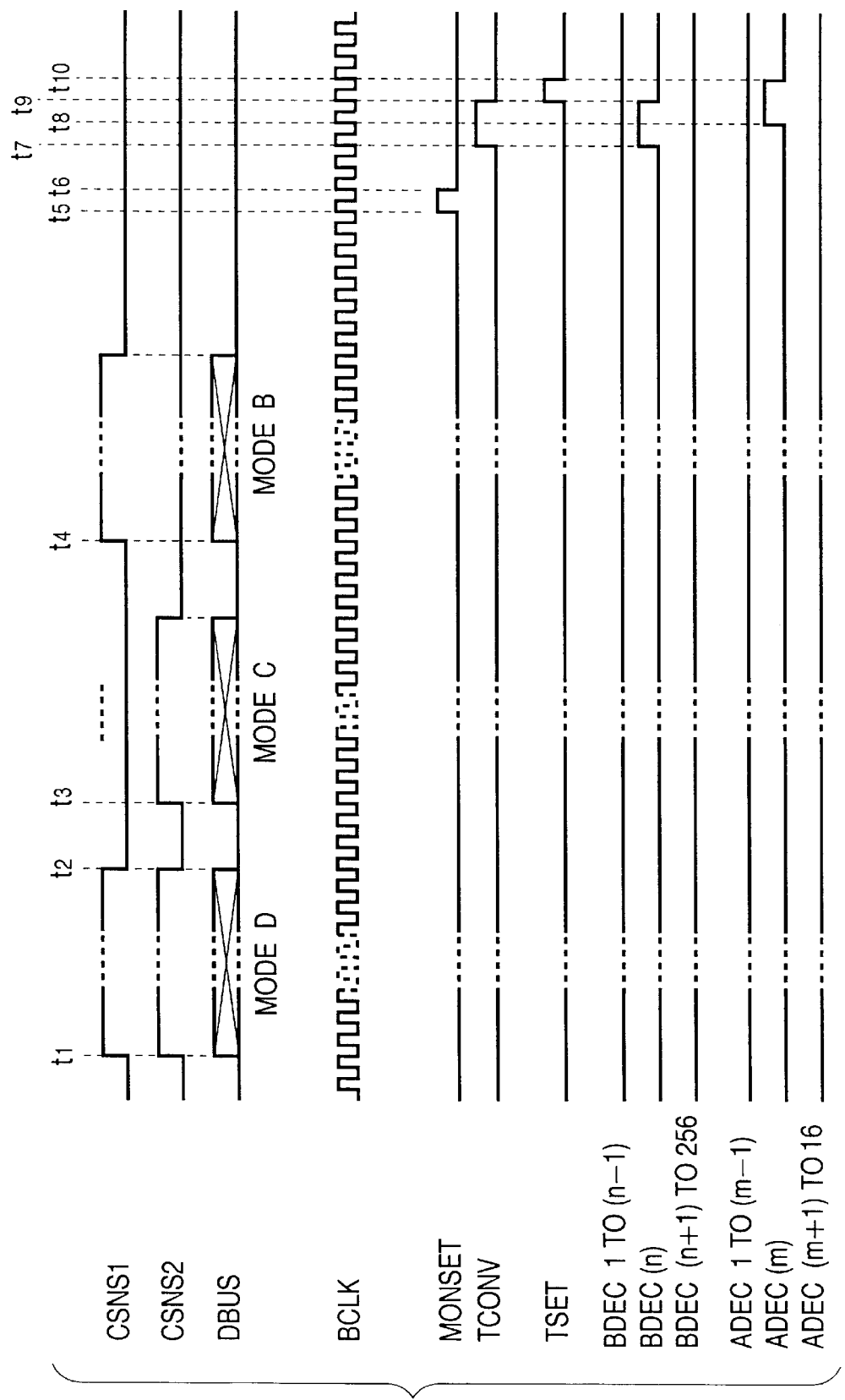
FIG. 8 is a timing chart showing the operation timings of the multiplexer DETMPX shown in FIG. 6.

FIG. 8 is a timing chart showing changes in communication modes between the control circuit PRS in FIG. 1 and the communication block SCOM (FIG. 4) in the AF area sensor device SNS, signals to be input from the communication block SCOM to the multiplexer DETMPX, and signals inside the multiplexer DETMPX, and this operation can set an address for one pair of line sensors.

In FIG. 8, at time t1, after the control signals CSNS1 and CSNS2 are raised to "H" level, a communication with the control circuit PRS is done in mode D via the data bus DBUS and is completed at time t2. With this communication, a pair of line sensors for which an address is set are designated. A pair of line sensors are designated per communication using the signals SC10 to SC13 and SC20 to SC23.

From time t3, the control signal CSNS2 alone is raised to "H" level, and thereafter, a communication with the control circuit PRS is done in mode C via the data bus DBUS. With this communication, address information to be set is designated. One address information is designated per communication using the signals SSL1 to SSL4.

At time t4, after the control signal CSNS1 alone is raised to "H" level, a communication with the control circuit PRS is done in mode B via the data bus DBUS. At this time, the signal SLM="1" is output to complete address setting based on the contents in the above-mentioned communication modes D and C. The operations described so far are made between the communication block SCOM and the control circuit PRS.

At time t5 after communication mode B is completed upon outputting the signal SLM="1", and a predetermined number of operation reference clocks BCLK are input, the signal MONSET to be output from the communication block SCOM to the count block CONT in the multiplexer DETMPX is raised to "H" level.

Thereafter, the signal TCONV is raised to "H" level at time t7. In response to this signal, the conversion block CONV converts a binary value represented by the signals SSL1 to SSL4 into a decimal value, and outputs the converted decimal value onto one of the signal lines ADEC1 to ADEC16 at time t8. Similarly, a decimal value obtained by converting a binary value represented by the signals SC10 to SC13 and SC20 to SC23 is output onto one of the signal lines BDEC1 to BDEC256.

FIG. 8 shows the contents when the decimal value obtained by converting the decimal value represented by the signals SSL1 to SSL4 is m, and the decimal value obtained by converting the binary value represented by the signals SC10 to SC13 and SC20 to SC23 is n. Hence, in FIG. 8, a signal ADEC(m) and a signal BDEC(n) change to "H" level.

Subsequently, when the signal TSET is raised to "H" level at time t9, the monitor output setting block MONSW sets an address m for an n-th pair of line sensors on the basis of the signals ADEC(m) and BDEC(n), i.e., sets to output an n-th accumulation monitor signal DET-n to an m-th signal line BMONm.

At time t10, address setting for a pair of line sensors, i.e., the operation for setting the address of the n-th pair of line sensors at m is completed, and the accumulation monitor signal DET-n from the n-th pair of line sensors is output onto the m-th signal line BMONm and is supplied to the AF sensor driving device SDR.

By repeating the above-mentioned operations, address setting is sequentially done in units of pairs of line sensors. When the above-mentioned operations are repeated 16 times, addresses can be set for 16 pairs of line sensors corresponding to the signal lines BMON1 to BMON16, and preparation for accumulation control based on the accumulation monitor signals is complete.

The AF sensor driving device SDR shown in FIG. 1 will be described in detail below with the aid of FIG. 9.

Figure 9:
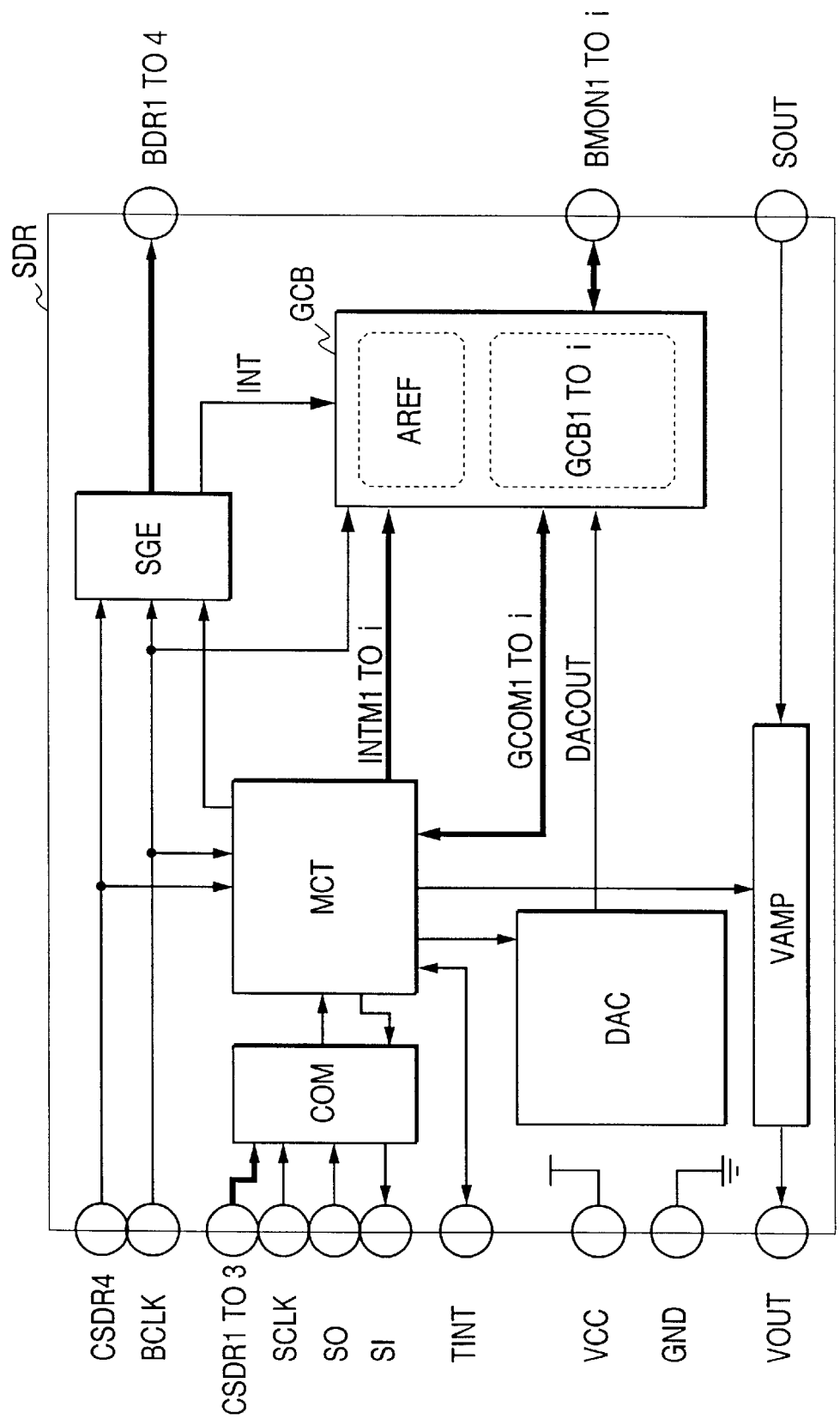
FIG. 9 is a block diagram showing an example of the detailed arrangement of an AF sensor driving device shown in FIG. 1.

As shown in FIG. 9, the AF sensor driving device SDR comprises a main controller MCT, a driving signal generator SGE, a gain controller GCB, a DA converter DAC, an image signal amplifier VAMP, and a communication block COM. The device SDR controls its internal DA converter DAC in accordance with signals input from the control circuit PRS shown in FIG. 1 to drive the AF area sensor device SNS.

The communication block COM exchanges data with the control circuit PRS. That is, the communication block COM receives communication mode signals CSDR1 to CSDR3, a communication clock signal SCLK, and data SO, and outputs a signal SI. When one of the communication mode signals CSDR1 to CSDR3 is "1", communications between the AF sensor driving device SDR and the control circuit PRS are permitted. At this time, the data SO and SI which are respectively received and transmitted in synchronism with the communication clock SCLK are enabled. However, when an abnormal communication state is detected, e.g., when a predetermined number of clock pulses of the communication clock SCLK cannot be received during a single communication, those communication data are disabled.

The data SO sent from the control circuit PRS in FIG. 1 is received by the communication block COM. Thereafter, if a normal communication state is detected, the received data SO is transferred to the main controller MCT, and its contents are held until the next data SO is received. The main controller MCT sends information from the gain controller GCB to the communication block COM, and can transmit it as the data SI to the control circuit PRS. Note that the communication contents will be described later.

The main controller MCT controls the DA converter DAC, gain controller GCB, and image signal amplifier VAMP on the basis of the contents of the data SO which is sent from the control circuit PRS and received by the communication block COM. Also, after driving of the AF area sensor device SNS is started, the main controller MCT controls the image signal amplifier VAMP on the basis of information from the gain controller GCB.

Signals INTM1 to INTMi supplied from the main controller MCT to the gain controller GCB inform the selection timing of the gain of an image signal. A plurality of gains are prepared in advance. When the gain controller GCB detects the trailing edges of the signals INTM1 to INTMi, it determines the gain and accumulation time in accordance with the input levels of the accumulation monitor signals on the signal lines BMON1 to BMONi.

The gain selected at that time is set in the internal image signal amplifier VAMP of the AF sensor driving device SDR, and an image signal input from the image signal output line SOUT of the AF area sensor device SNS is amplified by the image signal amplifier VAMP. Thereafter, the amplified image signal is output onto the image signal output line VOUT of the AF sensor driving device SDR.

Note that the signals INTM1 to INTMi are output from the main controller MCT on the basis of information (to be described later) transmitted as the data SO from the control circuit PRS shown in FIG. 1.

Signal lines GCOM1 to GCOMi are generic names of a plurality of signal lines used for exchanging signals between the main controller MCT and gain control blocks GCB1 to GCBi (to be described later).

The driving signal generator SGE has a function of generating driving signals BDR1 to BDR4 of the AF area sensor device SNS, and a signal INT for informing the gain controller GCB of accumulation driving of the AF area sensor device SNS, on the basis of information supplied from the main controller MCT and in synchronism with the operation reference clock BCLK.

The DA converter DAC outputs an analog signal selected from a predetermined variable output range on the basis of digital information from the main controller MCT. An analog signal DACOUT output from the DA converter DAC is parallelly input to the gain control blocks GCB1 to GCBi.

The gain controller GCB comprises the above-mentioned gain control blocks GCB1 to GCBi, and a comparison signal supply block AREF. The comparison signal supply block AREF supplies a comparison signal used for setting a comparison level required in accumulation control of the AF area sensor device SNS to the gain control blocks GCB1 to GCBi.

The gain control blocks GCB1 to GCBi set the comparison level on the basis of the analog comparison signal supplied from the comparison signal supply block AREF and the analog signal DACOUT output from the DA converter DAC. The gain control blocks GCB1 to GCBi have the same characteristics, and independently operate on the basis of information from the main controller MCT.

For example, the gain control block GCB1 receives an accumulation monitor signal output from the AF area sensor device SNS onto the signal line BMON1. The gain control block GCB1 compares the input accumulation monitor signal with the comparison level, which is set as described above, in synchronism with the operation reference clock BCLK, and supplies the comparison result to the main controller MCT. On the other hand, the gain control block GCB2 receives an accumulation monitor signal from the signal line BMON2, and performs similar comparison. The same applies to other gain control blocks GCB3 to GCBi.

The gain controller GCB outputs a predetermined control signal onto the signal lines BMON1 to BMONi, as needed.

When the control signal is output onto one of the signal lines BMON1 to BMONi, the corresponding pair of line sensors of the AF area sensor device SNS transfer the charge accumulated so far to a charge signal reading section (not shown) in the driving block DRVCNT shown in FIG. 4.

The image signal amplifier VAMP obtains, from the main controller MCT, gain information determined by the data SO from the control circuit PRS shown in FIG. 1, amplifies an image signal SOUT output from the AF area sensor device SNS by the obtained gain, and outputs the amplified signal to the control circuit PRS as an image signal VOUT.

Note that a series of driving operations, i.e., initialization, charge accumulation, and image signal reading, of the area sensor device SNS are performed in synchronism with the operation reference clock BCLK.

The signals CSDR1 to CSDR4 are used when the control circuit PRS communicates with the AF sensor driving device SDR.

More specifically, the control circuit PRS sets the communication mode of the AF sensor driving device SDR in accordance with the combination of the communication mode signals CSDR1 to CSDR3, and outputs predetermined data SO in synchronism with the communication clock SCLK. At the same time, the control circuit PRS receives data SI as an output from the AF sensor driving device SDR.

The contents of the data SO vary depending on the communication modes, and give information for selecting one of some driving modes prepared in advance in the AF sensor driving device SDR, for selecting one of i pairs of line sensors to be read out and selecting the gain for amplifying the readout image signal, and so on. The contents of the data SO will be described in detail later.

AF area sensor device SNS in two-way communications between the AF sensor driving device SDR and the control circuit PRS.

The image signal VOUT is obtained by amplifying and outputting the image signal SOUT from the AF area sensor device SNS by the gain based on the data SO, and is input to the analog input terminal (not shown) of the control circuit PRS. The control circuit PRS A/D-converts the input image signal VOUT, and executes a series of AF processing and arithmetic operations on the basis of the converted digital value.

The signal lines BMON1 to BMONi are used in two-way communications between the AF sensor driving device SDR and the control circuit PRS. For example, the AF area sensor device SNS generates outputs corresponding to the amounts of light incident on the pairs of line sensors in the device SNS. The signal lines BMON1 to BMONi respectively correspond to i pairs of line sensors selected from the AF area sensor device SNS.

The AF sensor driving device SDR detects whether or not one of the accumulation monitor signals supplied from the signal lines BMON1 to BMONi has reached a level designated in advance by the data SO. Upon detection of such signal, the device SDR outputs an accumulation completion signal to the AF area sensor device SNS via the detected one of the signal lines BMON1 to BMONi, and to the control circuit PRS via the signal line TINT.

The data SO and SI exchanged between the control circuit PRS and the AF sensor driving device SDR will be explained below.

Table 4 below shows the contents of the communication data SO and SI.

TABLE 4

| | | | | Communication Data SO (DO7 to DO0), SI (DI7 to DI0) | | | | | | | |
|---|---|---|---|---|---|---|---|---|---|---|---|
| Communication Mode | | | ←MSB | | | | | | | | LSB → |
| | CSD R3 | CSD R2 | CSD R1 | DO7 DI7 | DO6 DI6 | DO5 DI5 | DO4 DI4 | DO3 DI3 | DO2 DI2 | DO1 DI1 | DO0 DI0 |
| A | 0 | 0 | 0 | | | DO NOT CARE | | | | | |
| B | 0 | 0 | 1 | DA7 | DA6 | DA5 | DA4 | DA3 | DA2 | DA1 | DA0 |
| C | 0 | 1 | 0 | | | | | NOT USED | | | |
| D | 0 | 1 | 1 | | | | | | | | |
| E | 1 | 0 | 0 | | SITE | BMTE | CGM | | RGM | SRG2 | SRG1 |
| F | 1 | 0 | 1 | CGG2 | CGG1 | | | SLG4 | SLG3 | SLG2 RGL2 | SLG1 RGL1 |
| G | 1 | 1 | 0 | IE16 | IE15 | IE14 | IE13 | IE12 | IE11 | IE10 | IE09 |
| H | 1 | 1 | 1 | IE08 | IE07 | IE06 | IE05 | IE04 | IE03 | IE02 | IE01 |

The signal CSDR4 informs start of accumulation driving of the AF area sensor device SNS. When the sensor driving device SDR detects that the signal CSDR4 changes to "H" level, it outputs the driving signals BDR1 to BDR4 generated by the driving signal generator SGE to the AF area sensor device SNS so as to start a series of driving operations of the AF sensor driving devices, i.e., initialization, charge accumulation, and image signal reading. And, initialization, charge accumulation, switching of image signal reading and driving timing of the line sensors constructing the AF area sensor device SNS are controlled by combination of the driving signals BDR1 to BDR4.

A signal TINT is used for attaining accumulation end control and detection of each of i pairs of line sensors in the In Table 4, DO7 to DO0 in the upper row indicate the bits of the reception data SO in the AF sensor driving device SDR, and DI7 to DI0 in the lower row indicate the bits of the transmission data SI. This Table 4 exemplifies a case wherein i=16 and j=256, i.e., an AF area sensor device SNS including 256 pairs of line sensors is selectively controlled by 16 accumulation controllers.

More specifically, in this example, the gain controller GCB shown in FIG. 9 has 16 gain control blocks GCB1 to GCB16, and the multiplexer DETMPX shown in FIG. 4 selects 16 signals out of 256 accumulation monitor signals DET1 to DET256 and outputs the selected signals onto the signal lines BMON1 to BMON16.

The AF sensor driving device SDR drives the AF area sensor device SNS on the basis of the contents of the 1-byte reception data SO synchronized with the communication clock SCLK, as described above. The device SDR has eight different reception modes A to H selected by the signal states of the three signals CSDR1 to CSDR3 exchanged with the control circuit PRS, and switches the contents of the reception data SO in accordance with these reception modes.

In mode A with all the signals CSDR3 to CSDR1="0", the control circuit PRS communicates with a device different from the AF sensor driving device SDR. More specifically, in this mode A, the AF sensor driving device SDR is not selected as the other party by the control circuit PRS. Hence, in mode A, even when the communication clock SCLK and data SO are input, the AF sensor driving device SDR does not accept them.

Mode B is selected by setting the signal CSDR3="0", signal CSDR2="0", and signal CSDR1="1", and data for setting the output voltage of the DA converter DAC is input. In this mode B, 1-byte data including bits DA0 to DA7 is input from the control circuit PRS to the AF sensor driving device SDR as the data SO, thereby setting the output voltage of the DA converter DAC.

Modes C and D are not used.

Mode E is selected by setting the signal CSDR3="1", signal CSDR2="0", and signal CSDR1="0". In this mode E, the data SO including signals SITE, BTME, CGM, RGM, SRG2, and SRG1 in predetermined bits is input to the AF sensor driving device SDR. Upon reception of the accumulation completion signal from the signal line TINT, the control circuit PRS makes communications in mode E to detect the pair of line sensors that have completed charge accumulation.

The above-mentioned signal SITE is accumulation end control information, which is used for selecting whether the accumulation end control of the AF area sensor device SNS is performed based on the signal TINT from the control circuit PRS as an external input signal of the AF sensor driving device SDR or by the internal accumulation control of the AF sensor driving device. For example, if the signal SITE="1", the accumulation end control is done by the control circuit PRS using the external input signal TINT. At this time, all the accumulation-controlled line sensors simultaneously end accumulation.

The signal BTME is information used for discriminating the gains of the pairs of line sensors corresponding to addresses 1 to 16 on the basis of the accumulation monitor signals. This signal is enabled when the signal CGM (to be described later)="0". When the AF sensor driving device SDR detects communications with the signal BTME="1" in synchronism with the operation reference clock BCLK, it detects the level of the accumulation monitor signal output from the pair of line sensors corresponding to address 1 via the signal line BMON1 with a delay of several clocks after the detection. The device SDR determines the accumulation end level of the pair of line sensors corresponding to address 1 in accordance with the detected output level on the signal line BMON1, thus determining the gain upon reading.

The signal CGM is accumulation control mode information, which is common to all the pairs of line sensors corresponding to addresses 1 to 16. More specifically, if the signal CGM="1", accumulation control is done based on the gain arbitrarily selected by upper 2 bits CGG2 and CGG1 of the data SO in mode F (to be described later); if the signal CGM="0", accumulation control is done based on the gain determined by the output level of the accumulation monitor signal in communications with the signal BTME="1" described above.

The signal RGM is information for selecting the amplification mode of the image signal SOUT from the pair of line sensors selected to read out a signal. More specifically, if the signal RGM="0", amplification is done by the gain selected by the signals SRG2 and SRG1; and if the signal RGM="1", amplification is done by the gain determined during communications with the signal BTME="1" in mode E. Note that Table 5 shows the gains to be selected by the above-mentioned signals SRG2 and SRG1.

TABLE 5

| SRG2<br>or CGG2<br>or RGL2 | SRG1<br>or CGG1<br>or RGL1 | Gain |
|---|---|---|
| 0 | 0 | ×1 |
| 0 | 1 | ×2 |
| 1 | 0 | ×4 |
| 1 | 1 | ×8 |

Mode F is selected by setting the signal CSDR3="1", signal CSDR2="0", and signal CSDR1="1". In this mode F, the data SO including signals CGG2 and CGG1, and signals SLG4 to SLG1 in predetermined bits is input to the AF sensor driving device SDR, and the data SI including signals RGL2 and RGL1 in predetermined bits is output.

The signals CGG2 and CGG1 in the data SO are enabled when the signal CGM="1" in mode E, and give information for selecting one of gains prepared in advance. That is, by amplifying the image signal SOUT from the pair of line sensors corresponding to an address defined by the signals SLG4 to SLG1 by the gain selected by the signals CGG2 and CGG1, accumulation control is done to obtain an optimal image signal VOUT. Table 5 above also shows the gain selected by these signals CGG2 and CGG1.

The gain is set in accordance with the signals CGG2 and CGG1, as described above, and reading of the gain is used for detecting the gain selected when the signal BTME="1" in mode E.

The signals RGL2 and RGL1 in the data SI are enabled when the signal CGM in the data SO is "1" in mode E, and give information that indicates one of the gains prepared in advance, which is to be used for amplifying the image signal SOUT from the pair of line sensors corresponding to an address defined by the signals SLG4 to SLG1 so as to attain accumulation control that can obtain an optimal image signal VOUT. Table 5 also shows the gains selected by these signals RGL2 and RGL1.

Mode G is selected by setting the signal CSDR3="1", signal CSDR2="1", and signal CSDR1="0". In this mode G, the data SI including signals IE16 to IE09 in all eight bits is output.

Mode H is selected by setting the signal CSDR3="1", signal CSDR2="1", and signal CSDR1="1". In this mode H, the data SI including signals IE08 to IE01 in all eight bits is output.

The signals IE01 to IE16 output in modes G and H are accumulation completion information, and respectively correspond to the pairs of line sensors set at addresses 1 to 16. These signals IE01 to IE16 become "1" when accumulation is completed by the internal accumulation control of the AF sensor driving device SDR.

As described above, according to the first embodiment, since pairs of line sensors, image signals of which are required to be used in focus detection, are selected from a plurality of pairs of line sensors, and accumulation monitor signals output from the selected pairs of line sensors are supplied to the accumulation controllers, the accumulation controllers need not be prepared in correspondence with the number of pairs of line sensors. For this reason, a plurality of image signals which are accumulation-controlled with high precision can be obtained, the circuit scale required for the accumulation controllers can be reduced, and the consumption currents can be decreased. In this manner, practical merits are tremendous.

The second embodiment of the present invention will be described below.

In the first embodiment described above, connection setting between a predetermined number of pairs of line sensors selected from a plurality of pairs of line sensors that build the AF area sensor device SNS, and the accumulation controller (gain controller GCB) in the AF sensor driving device SDR is done in units of line, and communications for connection setting are repeated in correspondence with the number of pairs of line sensors to be accumulation-controlled.

In contrast to this, in the second embodiment, connection setting for a plurality of pairs of line sensors that are arranged consecutively is done by a single communication. More specifically, in the second embodiment, connection setting between the accumulation monitor signal outputs and the accumulation controllers is done in units of blocks.

Figure 10A:
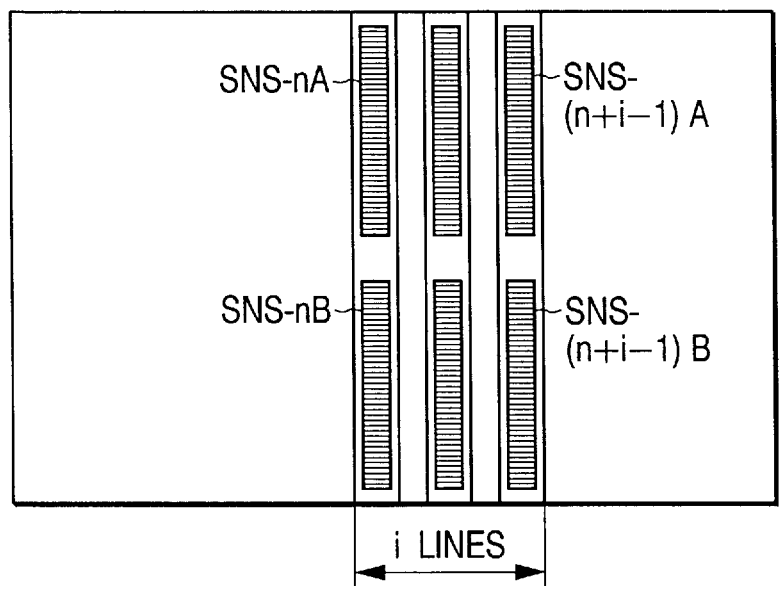
FIGS. 10A and 10B are schematic views showing an example of the arrangement of an AF area sensor device for performing AGC accumulation control according to the second embodiment of the present invention.
Figure 10B:
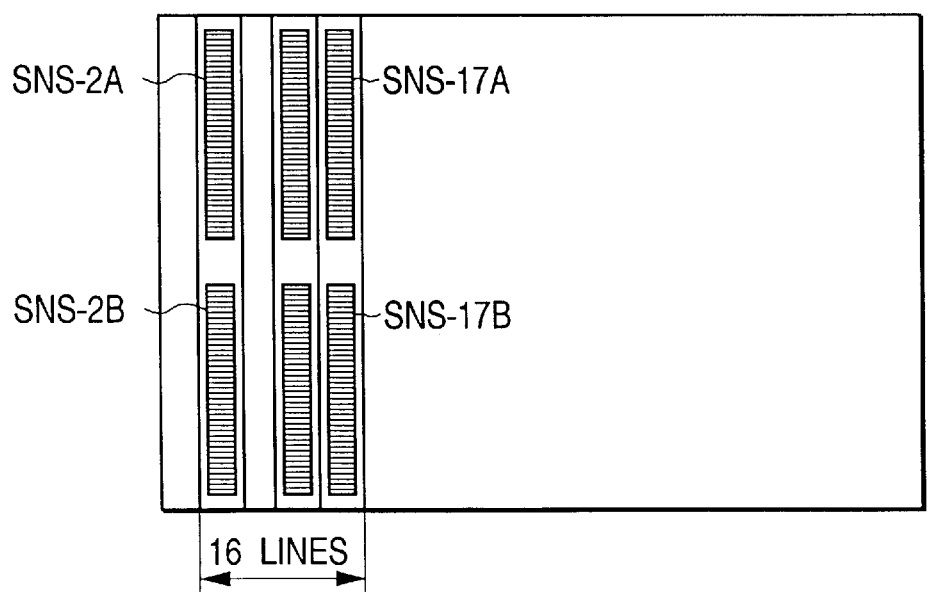

FIGS. 10A and 10B best illustrate the characteristic feature of this embodiment, and show only a portion of photoelectric conversion element arrays of the AF area sensor device SNS shown in FIG. 4. FIG. 10A shows the state wherein connection setting between the accumulation monitor signal outputs corresponding to i consecutive pairs of line sensors counted from the n-th pair of line sensors and the accumulation controllers is done so as to obtain received light information for these pairs of line sensors.

In this case, a connection setting communication is performed once by designating the n-th pair of line sensors SNS-nA and SNS-nB. Immediately after completion of this connection setting communication, i pairs of line sensors, i.e., n-th to (n+i−1)-th pairs of line sensors are sequentially connected to the accumulation controllers. At this time, address 1 is set for the n-th pair of line sensors SNS-nA and SNS-nB. Also, addresses 2 to i are set in turn for the (n+1)-th to (n+i−1)-th pairs of line sensors SNS-(n+1)A and SNS-(n+1)B to SNS-(n+i−1)A and SNS-(n+i−1)B.

FIG. 10B shows more practical contents, i.e., the state wherein connection setting between the accumulation monitor signal outputs corresponding to 16 consecutive pairs of line sensors counted from the second pair of line sensors, and the accumulation controller is done so as to obtain received light information for these 16 pairs of line sensors. More specifically, address 1 is set for the second pair of line sensors SNS-2A and SNS-2B, and addresses 2 to 16 are set in turn for the third to 17th pairs of line sensors SNS-3A and SNS-3B to SNS-17A and SNS-17B.

Note that the numerical value "16" is merely an example presented for the purpose of comparison with the first embodiment, and a value i smaller than the number j of pairs of line sensors that build the AF area sensor device SNS can be used within the scope of the present invention.

In this embodiment, the internal arrangement of the multiplexer DETMPX in the AF area sensor device SNS shown in FIG. 4 is different from that in the first embodiment. Hence, the arrangement and operation of the multiplexer DETMPX will be described below with the aid of FIGS. 11 and 12.

The block diagram of the multiplexer DETMPX shown in FIG. 11 will be explained first. The feature of FIG. 11 is that a register block ADRX is added to the block diagram of the multiplexer DEMPX shown in FIG. 6.

More specifically, in FIG. 6, the signals SSL1 to SSL4 are required to set an address of a pair of line sensors in units of lines. However, in FIG. 11, since addresses for the consecutive pairs of line sensors are set in turn from address 1, the need for the signals SSL1 to SSL4 is obviated, and the conversion block CONV comprises only one 8-bit converter.

Figure 11:
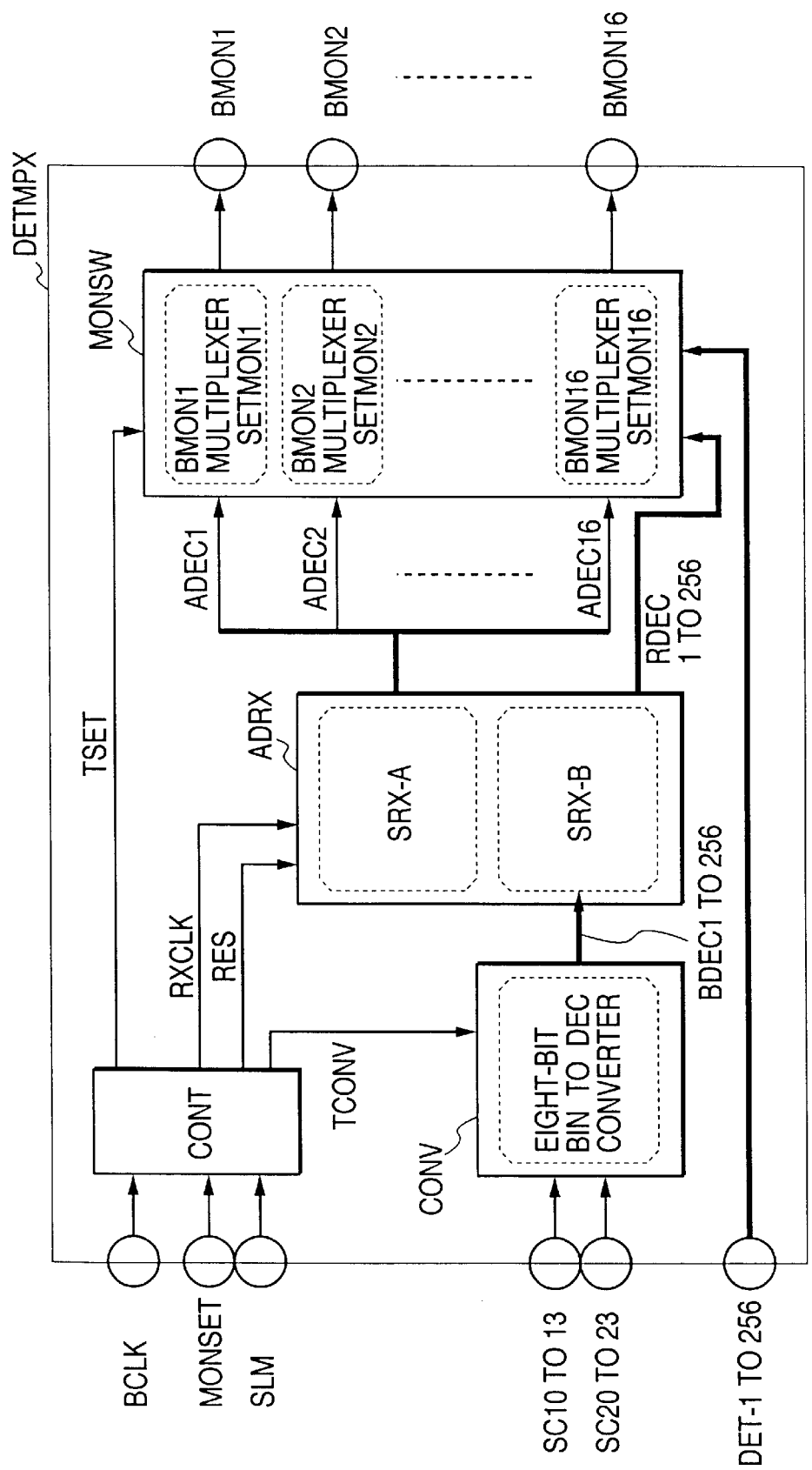
FIG. 11 is a block diagram showing another example of the detailed arrangement of the multiplexer DETMPX shown in FIG. 4.

Also, in FIG. 11, as timing signals for operating the register block ADRX, signals RXCLK and RES are supplied from the count block CONT to th register block ADRX.

Furthermore, the register block ADRX outputs signals BDEC1 to BDEC256 onto signal lines RDEC1 to RDEC256 on the basis of the signal RXCLK supplied from the count block CONT. The register block ADRX has two shift registers SRX-A and SRX-B, operates on the basis of the signal RXCLK supplied from the count block CONT, and is initialized by the signal RES.

Note that the internal operation of the monitor output setting block MONSW is substantially the same as that shown in FIG. 6, except that it receives signals RDEC1 to RDEC256 in FIG. 11 in place of the signals BDEC1 to BDEC256 shown in FIG. 6.

Figure 12:
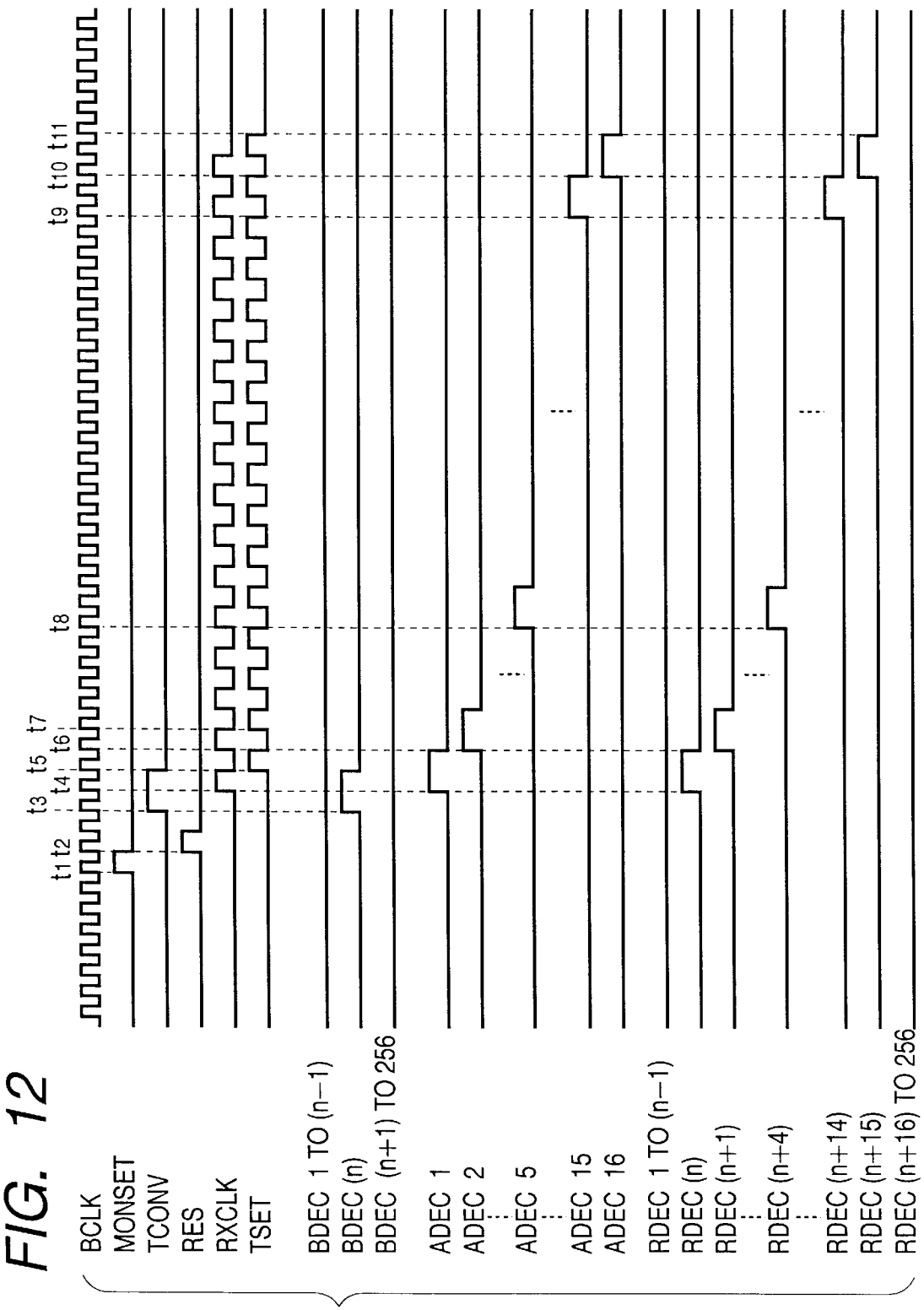
FIG. 12 is a timing chart showing the operation timings of the multiplexer DETMPX shown in FIG. 11.

The operation of the multiplexer DETMPX will be described below with reference to FIG. 12. FIG. 12 is a timing chart showing changes in signals input/output to/from the multiplexer DETMPX, and changes in internal signals. With this operation, address setting is sequentially done. Although not shown in FIG. 12, communications in modes B, C, and D are already made at the same timings as those in FIG. 8 of the first embodiment.

At time t1 after a communication with a signal SLM="1" is completed in communication mode B shown in Table 1 and a predetermined number of operation reference clocks BCLK are input, a signal MONSET to be output from the communication block SCOM shown in FIG. 4 to the count block CONT is raised to "H" level. Upon detection of the "H"-level signal MONSET, the count block CONT raises a signal RES to "H" level at time t2. In response to this signal, the two shift registers SRX-A and SRX-B in the register block ADRX are initialized.

At time t3 after an elapse of a time period corresponding to one operation reference clock BCLK from the trailing edge of the signal RES, a signal TCONV is raised to "H" level. The conversion block CONV outputs a result obtained by converting a binary value expressed by signals SC10 to SC13 and SC20 to SC23 into a decimal value onto one of signal lines BDEC1 to BDEC256. FIG. 12 shows a case wherein the converted decimal value is n, and a signal BDEC(n) changes to "H" level.

Thereafter, when a signal RXCLK is raised to "H" level at time t4, one shift register SRX-A in the register block ADRX raises a signal ADEC1 to "H" level, and the other shift register SRX-B raises a signal RDEC(n) to "H" level.

When a signal TSET is raised to "H" level at time t5, the monitor output setting block MONSW sets, in response to this signal, address 1 for the n-th pair of line sensors on the basis of the signals ADEC1 and RDEC(n), i.e., outputs the n-th accumulation monitor signal DET-n onto the first signal line BMON1.

At time t6, the signal RXCLK is raised to "H" level again. In response to this signal, the two shift registers SRX-A and SRX-B shift once. That is, one shift register SRX-A makes the signal ADEC1 fall to "L" level and raises a signal ADEC2 to "H" level. The other shift register SRX-B makes the signal RDEC(n) fall to "L" level, and raises a signal RDEC(n+1) to "H" level.

At time t7, when the signal TSET is raised to "H" level again, the monitor output setting block MONSW sets, in response to this signal, address 2 for the (n+1)-th pair of line sensors on the basis of the signals ADEC2 and RDEC(n+1), i.e., outputs the (n+1)-th accumulation monitor signal DET-(n+1) onto the second signal line BMON2.

By repeating the above-mentioned operation, at time t8, the block MONSW sets address 5 for the (n+4)-th pair of line sensors on the basis of signals ADEC5 and RDEC(n+4), i.e., outputs the (n+4)-th accumulation monitor signal DET-(n+4) onto the fifth signal line BMON5.

Also, address 15 is set for the (n+14)-th pair of line sensors at time t9, and address 16 is set for the (n+15)-th pair of line sensors at time t10. In this manner, sequential setting of addresses 1 to 16 for the n-th to (n+15)-th pairs of line sensors is complete at time t11.

As described above, after the communication for designating the head pair of line sensors, accumulation monitor signals DET-n to DET-(n+15) from the n-th to (n+15)-th pairs of line sensors are successively output onto the signal lines BMON1 to BMON16 so as to attain connection with the AF sensor driving device SDR and to complete preparation for the accumulation control based on the accumulation monitor signals.

In this manner, according to the second embodiment, since an area of pairs of line sensors to be connected to the accumulation controller is selected in units of blocks, the number of distance measurement points (areas) can be easily increased by simply increasing the number of blocks to be selected, image signals which are accumulation-controlled with high precision can be obtained.

The third embodiment of the present invention will be described below.

In the first embodiment described above, the AF area sensor device SNS and the AF sensor driving device SDR are independent devices. However, since the AF sensor driving device SDR performs a series of driving control operations of the AF area sensor device SNS upon reception of predetermined data or signals from the control circuit PRS, these two devices can be integrated.

Figure 13:
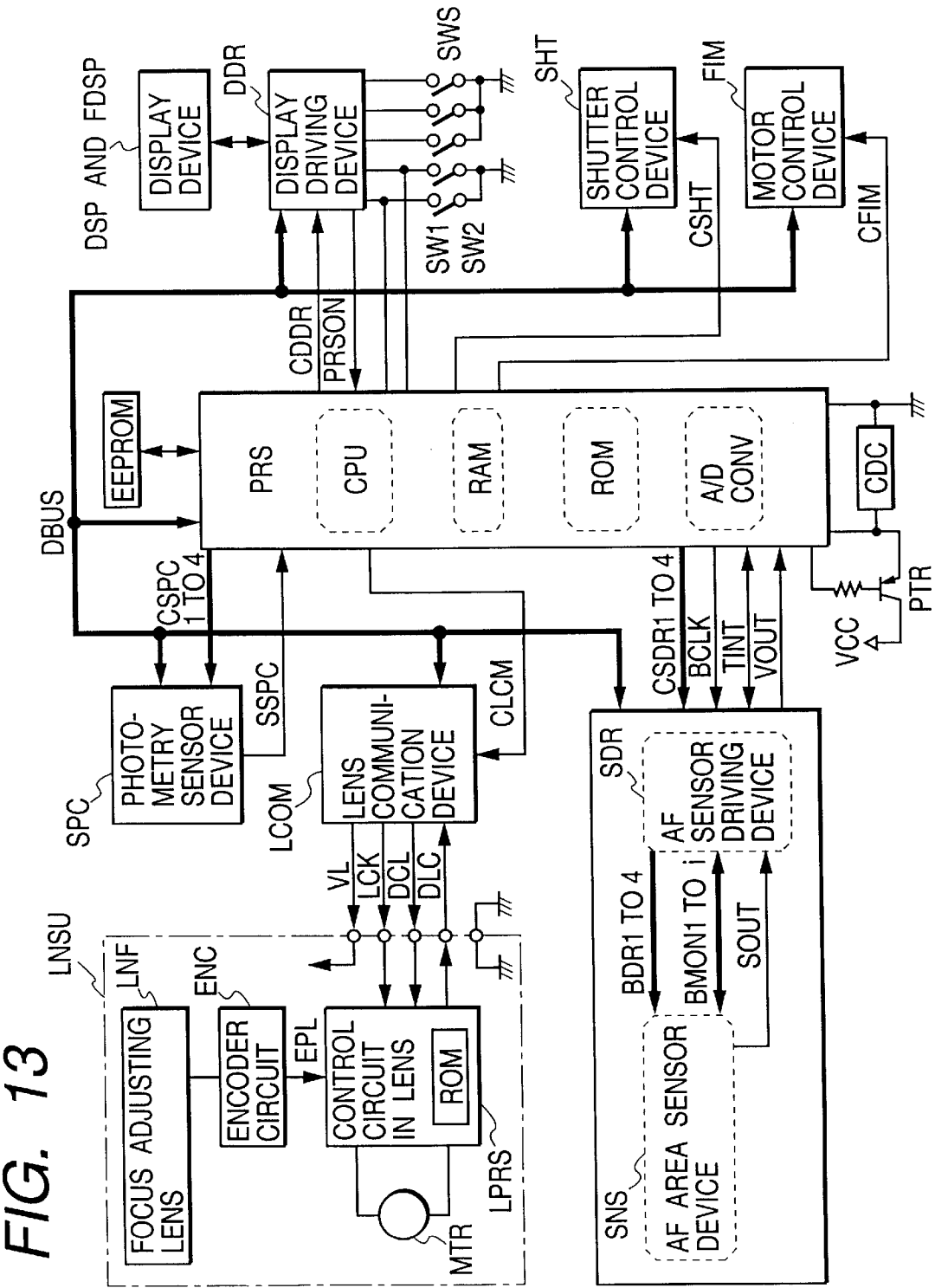
FIG. 13 is a block diagram showing the detailed arrangement of the third embodiment in which an accumulation control device for a photoelectric conversion element according to the present invention is built in a camera.

FIG. 13 is a block diagram that best illustrates the characteristic feature of the third embodiment, i.e., the arrangement in which the AF area sensor device SNS and the AF sensor driving device SDR are integrated, as described above. Since the blocks shown in FIG. 13 are the same as those in the first embodiment and have already been described, only the AF area sensor device SNS and the AF sensor driving device SDR will be explained below.

For the sake of simplicity, the AF area sensor device SNS and the AF sensor driving device SDR will be separately described. The AF area sensor device SNS will be described in detail below with reference to FIG. 14.

Figure 14:
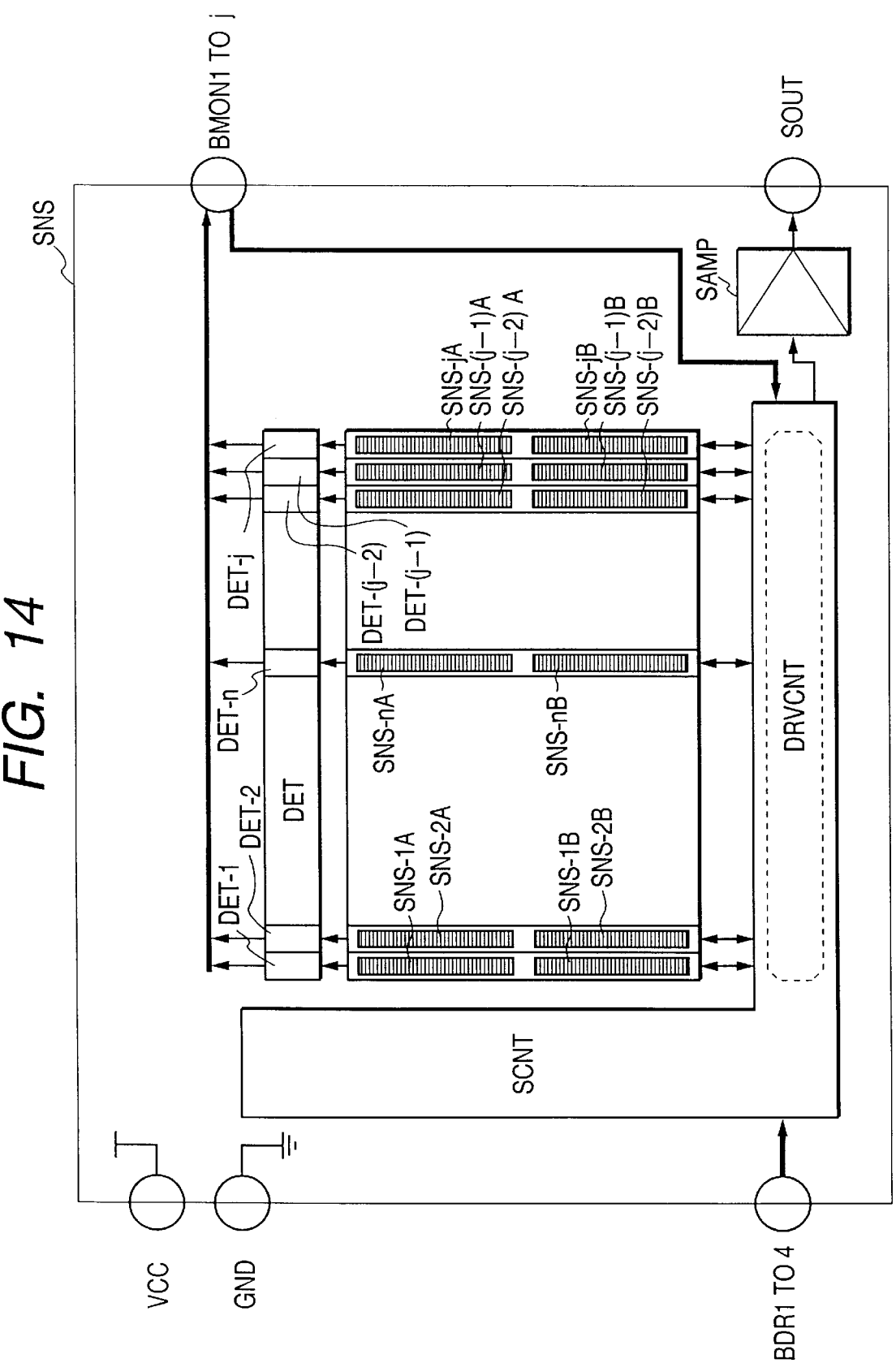
FIG. 14 is a block diagram showing an example of the detailed arrangement of an AF area sensor device SNS shown in FIG. 13.

In FIG. 14, the multiplexer DETMPX is omitted from the arrangement shown in FIG. 4 of the first embodiment, and all accumulation monitor signals DET-1 to DET-j are output onto signal lines BMON1 to BMONJ. Since the need for a communication function can be obviated, the communication block SCOM shown in FIG. 4 is also omitted. Furthermore, the pair of line sensors to be driven to read out a signal are selected by a driving signal BDR1. Other blocks are the same as those in FIG. 4.

Figure 15:
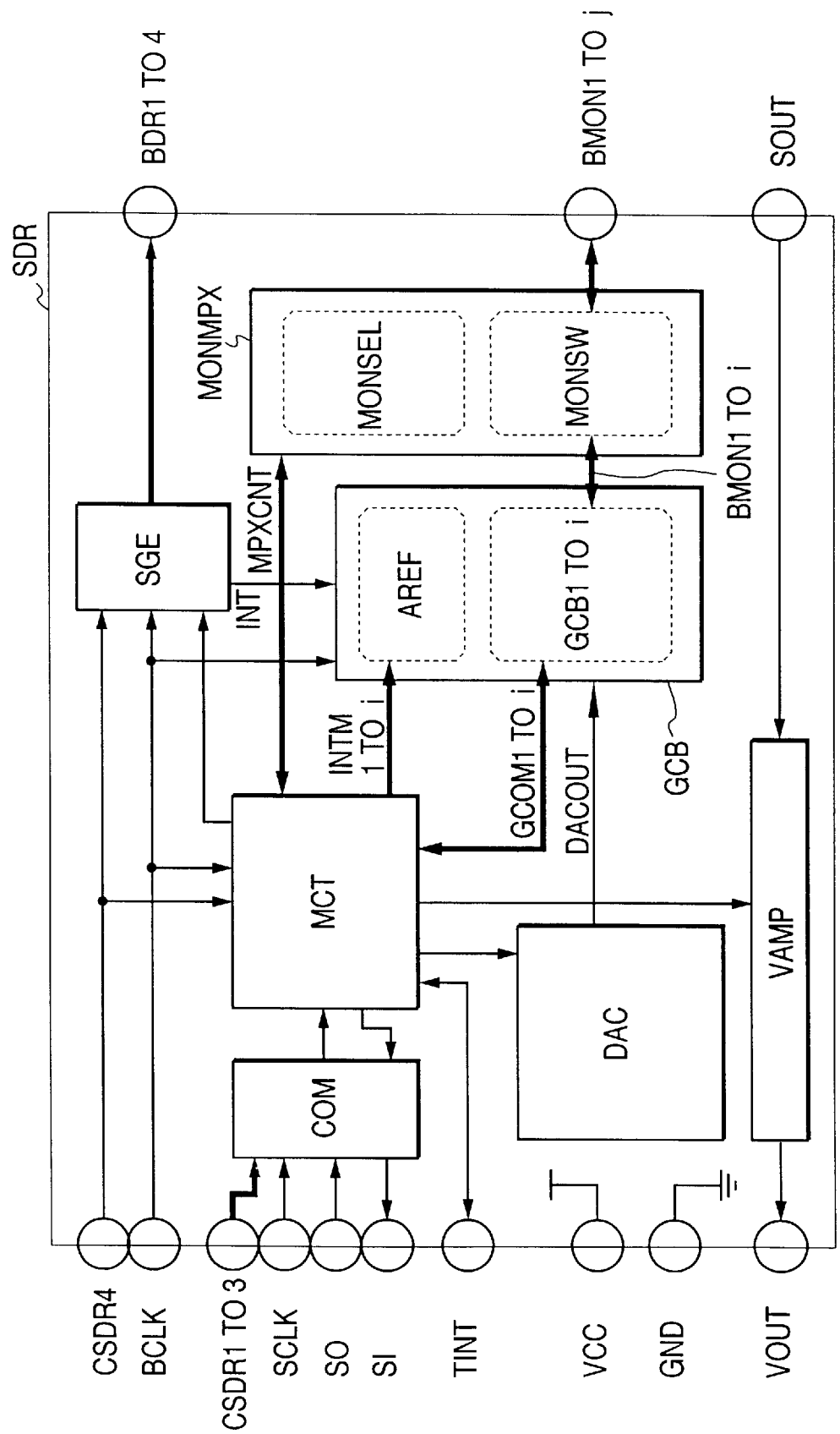
FIG. 15 is a block diagram showing an example of the detailed arrangement of an AF sensor driving device SDR shown in FIG. 13.

The AF sensor driving device SDR will be described in detail below with reference to FIG. 15. In FIG. 15, a monitor signal selection block MONMPX is added to the arrangement shown in FIG. 9. The monitor signal selection block MONMPX comprises two blocks MONSEL and MONSW, and receives the accumulation monitor signals DET-1 to DET-i from the accumulation monitor signal output unit DET in the AF area sensor device SNS via the signal lines BMON1 to BMONj. Also, the block MONMPX receives a signal MPXCNT from the main controller MCT.

The block MONSW in FIG. 15 has a function equivalent to that of the monitor output setting block MONSW shown in FIG. 6. That is, the block MONSW selects one of the j accumulation monitor signals DET-1 to DET-j input via the signal lines BMON1 to BMONj on the basis of a signal supplied from the block MONSEL, and outputs the selected signal to a corresponding one of the gain control blocks GCB1 to GCBi via signal lines BMON1 to BMONi. Note that i is a value smaller than j.

The block MONSEL shown in FIG. 15 has functions equivalent to those of the count block CONT and conversion block CONV shown in FIG. 6. Furthermore, the signal MPXCNT is a generic name of a plurality of signals used for controlling the block MONMPX, and includes signals input to the controller MCT via the communication block COM, and signals based on the operation reference clock BCLK.

Data signals SO and SI exchanged between the AF sensor driving device SDR shown in FIG. 15 and the control circuit PRS will be explained below.

Table 6 below shows the contents of the communication data SO and SI, and has contents as a combination of the functions of Tables 1 and 4 above.

TABLE 6

|  | Communication Mode | | | Communication Data SO (DO7 to DO0), SI (DI7 to DI0) ←MSB | | | | | | | LSB → |
|---|---|---|---|---|---|---|---|---|---|---|---|
|  | CSD R3 | CSD R2 | CSD R1 | DO7 DI7 | DO6 DI6 | DO5 DI5 | DO4 DI4 | DO3 DI3 | DO2 DI2 | DO1 DI1 | DO0 DI0 |
| A | 0 | 0 | 0 | DO NOT CARE | | | | | | | |
| B | 0 | 0 | 1 | DA7 | DA6 | DA5 | DA4 | DA3 | DA2 | DA1 | DA0 |
| C | 0 | 1 | 0 | NOT USED | | | | | | | |
| D | 0 | 1 | 1 | | | | | | | | |
| E | 1 | 0 | 0 | | SITE | BMTE | CGM | | RGM | SRG2 | SRG1 |
| F | 1 | 0 | 1 | CGG2 | CGG1 | | | SLG4 | SLG3 | SLG2 | SLG1 |

TABLE 6-continued

| | | | Communication Data SO (DO7 to DO0), SI (DI7 to DI0) | | | | | | | |
|---|---|---|---|---|---|---|---|---|---|---|
| Communication Mode | ←MSB | | | | | | | | | LSB → |
| | CSD R3 | CSD R2 | CSD R1 | DO7 DI7 | DO6 DI6 | DO5 DI5 | DO4 DI4 | DO3 DI3 | DO2 DI2 | DO1 DI1 | DO0 DI0 |
| G | 1 | 1 | 0 | SLM | | | | SSL4 | SSL3 | RGL2 SSL2 | RGL1 SSL1 |
| H | 1 | 1 | 1 | IE16 SC23 IE08 | IE15 SC22 IE07 | IE14 SC21 IE06 | IE13 SC20 IE05 | IE12 SC13 IE04 | IE11 SC12 IE03 | IE10 SC11 IE02 | IE09 SC10 IE01 |

That is, in Table 6, the signal SLM and the signals SSL4 to SSL1 in Table 1 are added to mode G in Table 4, and signals SC23 to SC20 and SC13 to SC10 in Table 1 are added to mode H in Table 4. Address setting of the pair of line sensors to be subjected to accumulation control and image signal read driving is done by successively making communications in two modes H and G.

More specifically, when information of the pair of line sensors to be set is sent in mode H, and the signal SLM="1" and the address to be set are sent in mode G, the address is set for that pair of line sensors immediately after the communication in mode G, and a register that stores the signal SLM is initialized to SLM="0". Since the contents of modes A to H have already been described in the first embodiment, a detailed description thereof will be omitted.

As described above, according to the third embodiment, since the AF area sensor device SNS and the AF sensor driving device SDR are integrated, the element layout of a sensor function block as a light-receiving unit, sensor driving block, and control block can be efficiently done on a semiconductor chip, thus physically reducing the apparatus size and eliminating the influences of environmental noise. In this manner, many merits can be obtained.

In the first to third embodiments described above, the photoelectric conversion element arrays of the pairs of line sensors SNS-1A and SNS-1B to SNS-jA and SNS-jB that build the AF area sensor device SNS correspond to photoelectric conversion element arrays of the present invention. The gain controller GCB corresponds to an accumulation controller of the present invention, the accumulation monitor signals DET-1 to DET-j correspond to accumulation monitor signals of the present invention, and the multiplexer DETMPX corresponds to accumulation monitor signal switching means of the present invention. Furthermore, the signal lines BMON1 to BMONi correspond to signal terminals (signal lines) which are selected and connected to the accumulation controller.

The correspondence between the arrangements of the embodiment and those of the present invention has been described. However, the present invention is not limited to the arrangements of these embodiments, but any other arrangements may be used as long as they can achieve functions within the scope of the appended claims.

The present invention can be applied to any area image sensor which is constituted by a plurality of photoelectric conversion element arrays and can perform accumulation control in units of photoelectric conversion element arrays, independently of the photoelectric conversion element arrays or the number of elements that make up each photoelectric conversion element array.

The present invention is not limited to the single-lens reflex camera, but can also be applied to a lens shutter camera, a video camera, optical equipment other than cameras, and other apparatuses, as long as they have an accumulation control device for a photoelectric conversion element.

Furthermore, the present invention can be applied to an arrangement in which photoelectric conversion units for outputting accumulation monitor signals are arranged in the vicinity of photoelectric conversion element arrays.

As described above, an accumulation control device for a photoelectric conversion element according to one aspect of the present invention, comprises accumulation controllers, which independently perform accumulation control of photoelectric conversion element arrays in accordance with accumulation monitor signals in units of arrays, and are fewer than the number of photoelectric conversion element arrays, and selectively switches the accumulation monitor signals to be supplied form the photoelectric conversion element arrays to the accumulation controllers. With this arrangement, since the light-receiving area can be broadened without increasing the circuit scale of the accumulation controllers, a decrease in yield and an increase in cost of the accumulation control device can be suppressed, and consumption power can be reduced.

According to another aspect of the present invention, an accumulation control device comprises accumulation controllers, which perform accumulation control of a plurality of photoelectric conversion element arrays that receive light beams from a plurality of areas corresponding to different object spaces and output accumulation monitor signals, in units of arrays in accordance with the accumulation monitor signals output from the photoelectric conversion element arrays, and which are fewer than the number of photoelectric conversion element arrays and selectively switches the accumulation monitor signals to be supplied from the photoelectric conversion element arrays to the accumulation controllers. With this arrangement, in addition to the above-mentioned effects, a large number of photoelectric conversion element arrays can be accumulation-controlled with high precision by a minimum circuit scale, and an adequate received light output can be obtained.

According to still another aspect of the present invention, an accumulation control device for performing accumulation control of an area image sensor constituted by consecutively arranging, adjacent to each other, a plurality of photoelectric conversion element arrays that receive light beams from a plurality of areas corresponding to different object spaces and output accumulation monitor signals, comprises accumulation controllers which perform accumulation control in units of arrays in accordance with the accumulation monitor signals output from the photoelectric conversion element arrays and are fewer than the number of photoelectric conversion element arrays, and selectively switches the accumulation monitor signals to be supplied from the photoelectric conversion element arrays to the accumulation controllers. In this device, of the plurality of consecutive photoelectric conversion element arrays, accumulation monitor signals output from the photoelectric conversion element arrays equal to the number of accumulation controllers are selected by switching means and are supplied to the accumulation controllers so as to perform the accumulation control. Hence, an accumulation control device which can easily cope with an increase in the number of light-receiving areas in addition to the above-mentioned effects, can be provided.

A focus detection apparatus according to still another aspect of the present invention uses the above-mentioned accumulation control device for the photoelectric conversion element, and comprises detection means for detecting a focus adjustment state of a photographing lens on the basis of a received light output obtained by receiving light beams coming from a plurality of areas corresponding to different object spaces via an imaging optical system to be subjected to focus detection. Hence, a focus detection apparatus which can perform focus detection without increasing the circuit scale of accumulation controllers or by increasing the number of distance measurement points or broadening the distance measurement area, and can realize precise focus detection over a broad range can be provided.

Since a camera according to still another aspect of the present invention comprises the above-mentioned focus detection apparatus, the distance measurement area can be broadened without increasing the circuit scale of accumulation controllers. With this arrangement, a decrease in yield or an increase in cost of the accumulation control device can be suppressed, and consumption power can be reduced. Hence, the battery consumption amount can be reduced, and high reliability can be assured for the user.

What is claimed is:

1. An accumulation control device for a photoelectric conversion element, comprising:

accumulation control means having accumulation controllers, which are fewer than the number of photoelectric conversion element arrays, and independently perform accumulation control of the photoelectric conversion element arrays respectively in accordance with accumulation monitor signals; and switching means for selectively switching the accumulation monitor signals to be supplied from the photoelectric conversion element arrays to the accumulation controllers.

2. An accumulation control device for a photoelectric conversion element, comprising:

a plurality of photoelectric conversion element arrays for receiving light beams from a plurality of areas corresponding to different object spaces and outputting accumulation monitor signals;

accumulation control means having accumulation controllers, which arc fewer than the number of photoelectric conversion element arrays, and perform accumulation control of said photoelectric conversion element arrays respectively in accordance with the accumulation monitor signals output from said photoelectric conversion element arrays; and switching means for selectively switching the accumulation monitor signals to be supplied from said photoelectric conversion element arrays to the accumulation controllers of said accumulation control means.

3. An accumulation control device for a photoelectric conversion element, which performs accumulation control of an area image sensor constituted by consecutively arranging, adjacent to each other, a plurality of photoelectric conversion elements that receive light beams from a plurality of areas corresponding to different object spaces and output accumulation monitor signals, comprising:

accumulation control means having accumulation controllers, which are fewer than the number of photoelectric conversion element arrays, and perform accumulation control respectively in accordance with the accumulation monitor signals output from the photoelectric conversion element arrays; and switching means for selectively switching the accumulation monitor signals to be supplied from the photoelectric conversion element arrays to the accumulation controllers, wherein the accumulation monitor signals output from the photoelectric conversion element arrays, equal to the number of the accumulation controllers, of the plurality-of consecutive photoelectric conversion element arrays are selected by said switching means and are supplied to the accumulation controllers of said accumulation control means so as to perform the accumulation control.

4. A focus detection apparatus using an accumulation control device for a photoelectric conversion element of claim 2, further comprising:

detection means for detecting a focus adjustment state of a photographing lens on the basis of a received light output obtained by receiving light beams from a plurality of areas corresponding to different object spaces via an imaging optical system to be subjected to focus detection.

5. A camera comprising a focus detection apparatus of claim 4.

6. A device according to claim 3, further comprising detection means for detecting a focus adjustment state of a photographing lens on the basis of a received light output obtained by receiving light beams from a plurality of areas corresponding to different object spaces via an imaging optical system to be subjected to focus detection.

7. A camera comprising an accumulation control device of claim 6.

* * * * *

UNITED STATES PATENT AND TRADEMARK OFFICE
CERTIFICATE OF CORRECTION

PATENT NO. : 5,842,058
DATED : November 24, 1998
INVENTOR(S) : Shinichi Hagiwara It is certified that error appears in the above-identified patent and that said Letters Patent is hereby corrected as shown below:

Column 15, line 51, after the letter "'H'" and before the number "'1'", insert -- = --.
Column 24, in Table 4, row C, column CSDR2: insert --1--.
Column 28, line 15, change "th" to --the--.
Column 30, line 12, change "BMONJ" to --BMONj--.
Column 30, in Table 6, row C, column CSDR2: insert --1--.
Column 32, line 36, change "form" to --from--.

In the Claims:

Claim 2, Column 34, line 2, change "arc" to --are--.

Signed and Sealed this

Eleventh Day of May, 1999

*Attest:*

Q. TODD DICKINSON

*Attesting Officer*     *Acting Commissioner of Patents and Trademarks*